(12) United States Patent
Muraoka et al.

(10) Patent No.: US 10,679,356 B2
(45) Date of Patent: Jun. 9, 2020

(54) DYNAMIC ANALYSIS SYSTEM

(71) Applicant: Konica Minolta, Inc., Chiyoda-ku, Tokyo (JP)

(72) Inventors: Shintaro Muraoka, Hachioji (JP); Shikou Kaneko, Tokorozawa (JP)

(73) Assignee: KONICA MINOLTA, INC., Tokyo (JP)

(*) Notice: Subject to any disclaimer, the term of this patent is extended or adjusted under 35 U.S.C. 154(b) by 103 days.

(21) Appl. No.: 15/988,564

(22) Filed: May 24, 2018

(65) Prior Publication Data

US 2018/0268555 A1    Sep. 20, 2018

Related U.S. Application Data

(63) Continuation of application No. 15/159,152, filed on May 19, 2016, now Pat. No. 10,026,188.

(30) Foreign Application Priority Data

May 25, 2015 (JP) ................ 2015-105322

(51) Int. Cl.
*G06K 9/00* (2006.01)
*G06T 7/20* (2017.01)
*G06T 5/00* (2006.01)
*G06T 7/00* (2017.01)

(52) U.S. Cl.
CPC .......... *G06T 7/20* (2013.01); *G06T 5/008* (2013.01); *G06T 7/0016* (2013.01); *G06T 2207/10016* (2013.01); *G06T 2207/10116* (2013.01); *G06T 2207/30061* (2013.01)

(58) Field of Classification Search
CPC combination set(s) only.
See application file for complete search history.

(56) References Cited

U.S. PATENT DOCUMENTS

| 5,850,465 | A | * | 12/1998 | Shimura | ............ | G06K 9/4604 |
| | | | | | | 382/132 |
| 8,340,378 | B2 | | 12/2012 | Knapp et al. | | |
| 8,768,027 | B2 | | 7/2014 | Chen et al. | | |
| 9,117,287 | B2 | * | 8/2015 | Masumoto | ............ | A61B 6/032 |

(Continued)

FOREIGN PATENT DOCUMENTS

| JP | 2004312434 A | 11/2004 |
| JP | 2012000297 A | 1/2012 |

(Continued)

OTHER PUBLICATIONS

JP Notification of Reasons for Refusal corresponding to Application No. 2015-105322; dated May 15, 2018.

(Continued)

*Primary Examiner* — Jose L Couso
(74) *Attorney, Agent, or Firm* — Cantor Colburn LLP

(57) ABSTRACT

A dynamic analysis system includes an imaging unit, an attenuation process unit and an analysis unit. The imaging unit images a dynamic state of a subject, thereby generating a plurality of frame images showing the dynamic state of the subject. The attenuation process unit performs an attenuation process to attenuate an image signal component of a product in the frame images. The analysis unit analyzes the dynamic state of the subject based on the frame images after the attenuation process.

5 Claims, 6 Drawing Sheets

(56) References Cited

U.S. PATENT DOCUMENTS

| | | | |
|---|---|---|---|
| 9,177,374 B2 | 11/2015 | Stayman et al. | |
| 2005/0025365 A1* | 2/2005 | Oosawa | G06T 7/0012 382/218 |
| 2007/0071299 A1* | 3/2007 | Matsuura | G06T 11/005 382/128 |
| 2010/0074490 A1* | 3/2010 | Arakita | G06T 7/0012 382/128 |
| 2011/0019886 A1* | 1/2011 | Mizuno | G06T 7/0014 382/128 |
| 2011/0123074 A1 | 5/2011 | Nie et al. | |
| 2011/0226956 A1* | 9/2011 | Miyamoto | A61B 6/00 250/354.1 |
| 2012/0020452 A1* | 1/2012 | Arakita | A61B 6/03 378/8 |
| 2012/0237104 A1* | 9/2012 | Fouras | A61B 5/08 382/132 |
| 2014/0180063 A1* | 6/2014 | Zhao | G06T 7/75 600/424 |
| 2015/0003710 A1* | 1/2015 | Masumoto | A61B 5/055 382/131 |
| 2015/0008918 A1 | 1/2015 | Nittka | |
| 2015/0150482 A1* | 6/2015 | Fouras | A61B 5/1128 600/410 |
| 2016/0084931 A1 | 3/2016 | Bachschmidt et al. | |
| 2016/0267654 A1* | 9/2016 | Wang | G06T 7/20 |
| 2016/0371862 A1 | 12/2016 | Silver et al. | |
| 2017/0148158 A1 | 5/2017 | Najarian et al. | |
| 2017/0236309 A1 | 8/2017 | Arens et al. | |
| 2018/0279997 A1* | 10/2018 | Abe | A61B 8/5223 |

FOREIGN PATENT DOCUMENTS

| | | |
|---|---|---|
| WO | 2009090894 A1 | 7/2009 |
| WO | 2014175853 A1 | 10/2014 |

OTHER PUBLICATIONS

JPO Notice of Reasons for Refusal corresponding to Application No. 2018-187120; dated Aug. 6, 2019.

Kazuya Nakahama et al., "Prediction of the Postoperative Lung Function in Patients with Primary Lung Cancer," First Department of Surgery, Osaka University Medical School; Dated Dec. 11, 1981, pp. 429-434.

Rie Tanaka et al., "Pulmonary Functional Diagnostic Imaging Using a Dynamic Flat-panel Detector: Comparison with Findings in Pulmonary Scintigraphy," Kanazawa University; Received on Jan. 6, 2009.

Yoshiaki Flirose et al., "Lung perfusion SPECT in predicting postoperative pulmonary function in lung cancer," Annals of Nuclear Medicine, vol. 7, No. 2, pp. 123-126; 1993.

* cited by examiner

DYNAMIC ANALYSIS SYSTEM

CROSS-REFERENCE TO RELATED APPLICATIONS

This application is a continuation under 35 U.S.C. § 120 of Ser. No. 15/159,152, filed May 19, 2016, which is incorporated herein reference and which claimed priority to Japanese Application No. 2015-105322, filed May 25, 2015. The present application likewise claims priority under 35 U.S.C. § 119 to Japanese Application No. 2015-105322, filed May 25, 2015, the entire content of which is also incorporated herein by reference.

FIELD OF THE INVENTION

The present invention relates to a dynamic analysis system.

DESCRIPTION OF THE RELATED ART

With the advent of dynamic FPDs (Flat Panel Detectors), there has been proposed a method of: performing continuous X-ray imaging on a site of a human body to be diagnosed, thereby imaging a dynamic state of the site; and analyzing a function of the site. (Refer to, for example, Japanese Patent Application Publication No. 2004-312434.)

There has also been proposed generating, as diagnostic support information, a characteristic amount related to a function of a dynamic state, such as the ventilation function or the bloodstream function, based on a series of frame images obtained by dynamic imaging. (Refer to, for example, International Patent Application Publication No. 2009/090894.)

By the way, during or after surgeries, patients are often connected to medical tubes such as central venous catheters and drainage tubes (shown in FIG. 8). When dynamic X-ray imaging of the chests of these patients who are subjects is performed, and dynamic analysis is performed on the obtained dynamic images, movements of products such as medical tubes accompanying body movement, pulsation and/or respiration of the patients become artifacts in the analysis results. In particular, in diagnosis during or after surgeries, the analysis results are often compared with analysis results of images of the patients taken before the surgeries in a state in which no products such as medical tubes are attached to the patients or, as follow-up, compared with analysis results of images of the patients taken in the past. If products such as medical tubes are captured, it is difficult to determine whether difference between the analysis results shows change in the state(s) of the patients or shows presence/absence of products such as medical tubes. Similarly, products such as pacemakers, implantable cardiac defibrillators, and metallic plates, screws and bolts to fix broken collarbone, ribs and vertebrae also become artifacts in the analysis results if move accompanying body movement, pulsation and/or respiration of patients.

BRIEF SUMMARY OF THE INVENTION

Objects of the present invention include improving diagnostic accuracy based on analysis results of dynamic images.

In order to achieve at least one of the objects, according to an aspect of the present invention, there is provided A dynamic analysis system including: an imaging unit which images a dynamic state of a subject, thereby generating a plurality of frame images showing the dynamic state of the subject; an attenuation process unit which performs an attenuation process to attenuate an image signal component of a product in the frame images; and an analysis unit which analyzes the dynamic state of the subject based on the frame images after the attenuation process.

BRIEF DESCRIPTION OF THE SEVERAL VIEWS OF THE DRAWING

The present invention is fully understood from the detailed description given hereinafter and the accompanying drawings, which are given by way of illustration only and thus are not intended to limit the present invention, wherein.

DETAILED DESCRIPTION OF THE INVENTION

Hereinafter, preferred embodiments of the present invention are described with reference to the drawings. However, the present invention is not limited thereto.

First Embodiment (Configuration of Dynamic Analysis System 100)

First, the configuration of a first embodiment of the present invention is described.

Figure 1:
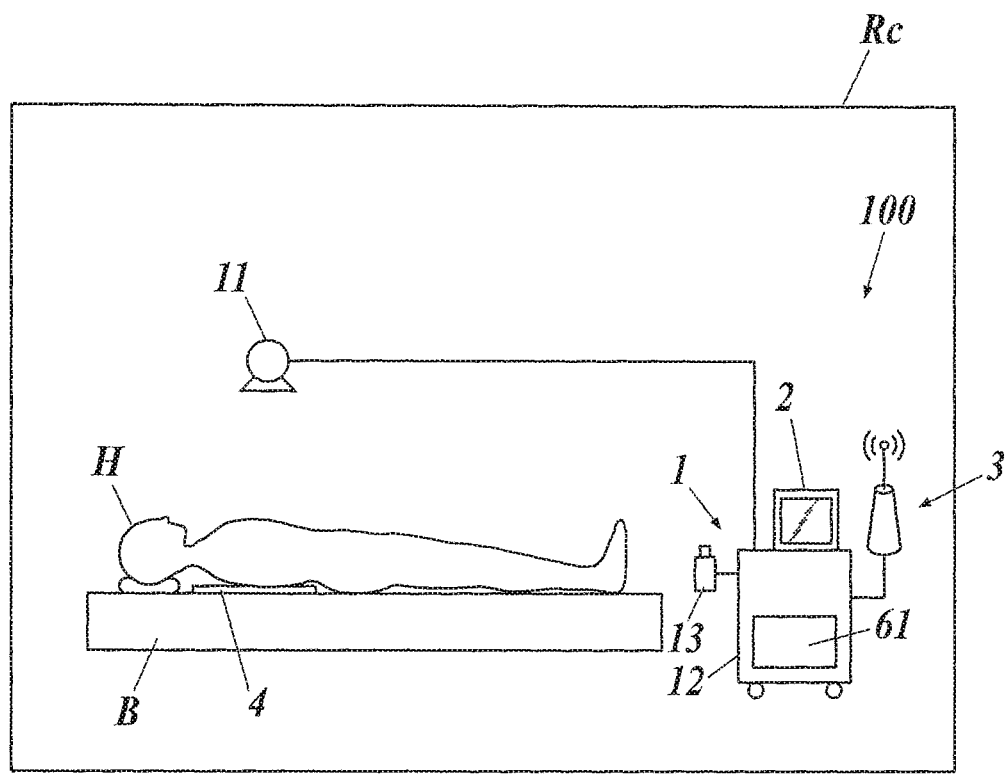
FIG. 1 shows the overall configuration of a dynamic analysis system according to an embodiment of the present invention.

FIG. 1 shows an example of the overall configuration of a dynamic analysis system 100 of the embodiment.

The dynamic analysis system 100 is, for example, a visiting system for imaging patients who cannot move easily because they are in surgeries, after surgeries or the like, and includes a radiation generation apparatus 1, a console 2, an access point 3 and an FPD (Flat Panel Detector) cassette 4. The radiation generation apparatus 1 has wheels and is configured as a movable visiting cart provided with the console 2 and the access point 3. In the dynamic analysis system 100, the console 2 is communicable/connectable with the radiation generation apparatus 1 and the FPD cassette 4 via the access point 3.

As shown in FIG. 1, the dynamic analysis system 100 is brought into a surgery room, an intensive care unit (ICU), a hospital's ward Rc or the like and performs dynamic imaging of a subject H therein by emitting radiation from a portable radiation source 11 of the radiation generation apparatus 1 in a state in which the FPD cassette 4 is inserted, for example, into between (i) the subject H lying on a bed B and (ii) the bad B or into a not-shown insertion slot provided on a side of the bed B opposite to the side where the subject H lies.

Dynamic imaging means obtaining a plurality of images of a subject H by repeatedly emitting pulsed radiation such as pulsed X-rays at predetermined time intervals (i.e., pulse emission) to the subject H or continuously emitting radiation such as X-rays at a low dose rate without a break (i.e., continuous emission) to the subject H. By dynamic imaging, a cyclic dynamic state of a subject H is imaged. Examples of the cyclic dynamic state include: shape change of the lung, i.e., expansion and contraction of the lung, accompanying respiration (i.e., breathing); and pulsation of the heart. A series of images obtained by this continuous imaging is called a dynamic image. The images constituting a dynamic image are called frame images.

In the embodiment, the dynamic analysis system 100 images the chest of a subject H, thereby imaging its dynamic state. However, the imaging site is not limited thereto.

Hereinafter, apparatuses or the like constituting the dynamic analysis system 100 are described.

The radiation generation apparatus 1 can perform at least one of pulse emission and continuous emission. The radiation generation apparatus 1 includes the radiation source 11, a radiation emission control unit 12 and an exposure switch 13.

The radiation source 11 emits radiation (e.g., X-rays) to a subject H under the control of the radiation emission control unit 12.

The radiation emission control unit 12 controls the radiation source 11 based on radiation emission conditions sent from the console 2 so as to perform radiography. The radiation emission conditions input from the console 2 include, for example, a tube current, a tube voltage, a frame rate (i.e., the number of frame images taken per unit time (e.g., one second), total imaging time for each imaging or the total number of frame images taken by each imaging, type of an added filter and, in the case of pulse emission, radiation emission time for each frame image.

The exposure switch 13 inputs radiation emission command signals to the console 2 by being pressed.

The console 2 outputs the radiation emission conditions to the radiation generation apparatus 1 and outputs image reading conditions to the FPD cassette 4 so as to control radiography and reading of radiographs, performs preview display of image data sent from the FPD cassette 4, and analyzes the image data so as to calculate characteristic amounts related to a ventilation function and a bloodstream function of the lung.

Figure 2:
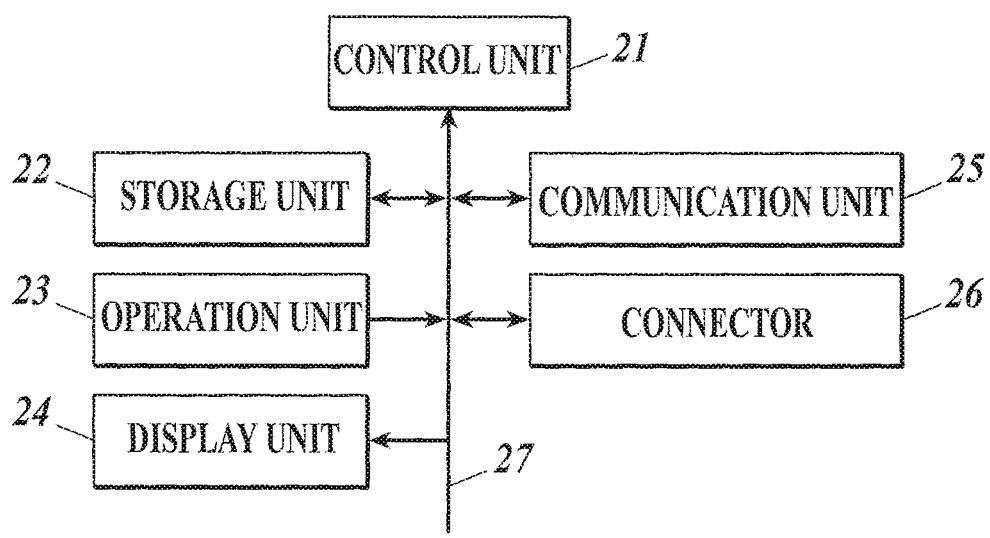
FIG. 2 is a block diagram showing the functional configuration of a console shown in FIG. 1.

FIG. 2 shows an example of the functional configuration of the console 2. As shown in FIG. 2, the console 2 includes a control unit 21, a storage unit 22, an operation unit 23, a display unit 24, a communication unit 25 and a connector 26. These components are connected to one another via a bus 27.

The control unit 21 includes a CPU (Central Processing Unit) and a RAM (Random Access Memory). The CPU of the control unit 21 reads a system program and various process programs stored in the storage unit 22 in response to operations through the operation unit 23, opens the read programs in the RAM and performs various processes such as the below-described imaging control process and dynamic analysis process in accordance with the opened programs, thereby performing concentrated control of actions of the components of the console 2, the radiation generation apparatus 1 and the FPD cassette 4. The control unit 21 functions as an attenuation process unit, an analysis unit and a recognition unit.

The storage unit 22 is constituted of a nonvolatile semiconductor memory, a hard disk and/or the like. The storage unit 22 stores therein various programs to be executed by the control unit 21, parameters necessary to perform processes in accordance with the programs, and data such as process results. For example, the storage unit 22 stores therein a program to perform the imaging control process shown in FIG. 3 and a program to perform the dynamic analysis process shown in FIG. 4. These various programs are stored in the form of a readable program code(s), and the control unit 21 acts following the program code(s).

The storage unit 22 also stores therein the radiation emission conditions and the image reading conditions for dynamic imaging. The radiation emission conditions and the image reading conditions can be set by a user operating the operation unit 23.

The storage unit 22 also stores therein image data sent from the FPD cassette 4 correlated with patient information on subjects H, analysis results calculated based on the image data, and so forth.

The operation unit 23 includes: a keyboard including cursor keys, number input keys and various function keys; and a pointing device such as a mouse, and outputs, to the control unit 21, command signals input through key operations to the keyboard and mouse operations. The operation unit 23 may be provided with a touch panel on a display screen of the display unit 24. In this case, the operation unit 23 outputs command signals input through the touch panel to the control unit 21.

The display unit 24 is constituted of a monitor such as an LCD (Liquid Crystal Display) or a CRT (Cathode Ray Tube) and displays commands input from the operation unit 23, data and so forth in response to display command signals input from the control unit 21.

The communication unit 25 includes a wireless LAN adaptor and controls data sending/receiving to/from external apparatuses such as the radiation generation apparatus 1 and the FPD cassette 4 connected to a communication network, such as a wireless LAN, via the access point 3.

The connector 26 is for communicate/connect with the FPD cassette 4 via a not-shown cable.

Back to FIG. 1, the access point 3 relays, for example, communications between the radiation generation apparatus 1 and the console 2 and communications between the console 2 and the FPD cassette 4.

The FPD cassette 4 is a portable dynamic radiation detector. The FPD cassette 4 is constituted of radiation detection elements arranged at predetermined points on a substrate, such as a glass substrate, in a matrix (two-dimensionally). The radiation detection elements detect radiation (i.e., intensity of radiation) emitted from the radiation source 11 and at least passing through a subject H, convert the detected radiation into electric signals, and accumulate the electric signals therein. The radiation detection elements are connected to switching elements such as TFTs (Thin Film Transistors), and the switching elements control accumulation/reading of the electric signals in/from the radiation detection elements, whereby image data (frame images) are obtained. There are an indirect conversion type FPD which converts radiation into electric signals with a photoelectric conversion element(s) via a scintillator(s) and a direct conversion type FPD which directly converts radiation into electric signals. Either of them can be used here.

The FPD cassette 4 includes: a reading control unit which controls the switching elements to accumulate and read the electric signals; and a communication unit which communicates/connects with the console 2 via the access point 3 (both not shown). The image reading conditions such as a frame rate, the number of frame images taken by each imaging and an image size (matrix size) are set by the console 2 through the communication unit. The reading control unit controls the switching elements to accumulate/read the electric signals in/from the radiation detection elements based on the set image reading conditions. The FPD cassette 4 has a connector to communicate/connect with the console 2 via a not-shown cable.

The FPD cassette 4 may be carried by a photographer such as a radiologist. However, the FPD cassette 4 is relatively heavy and may be broken or damaged when dropped. Therefore, the FPD cassette 4 is configured to be conveyed by being inserted into a cassette pocket 61 provided on the visiting cart.

(Actions of Dynamic Analysis System 100)

Next, actions of the dynamic analysis system 100 are described.

First, an imaging action is described.

Figure 3:
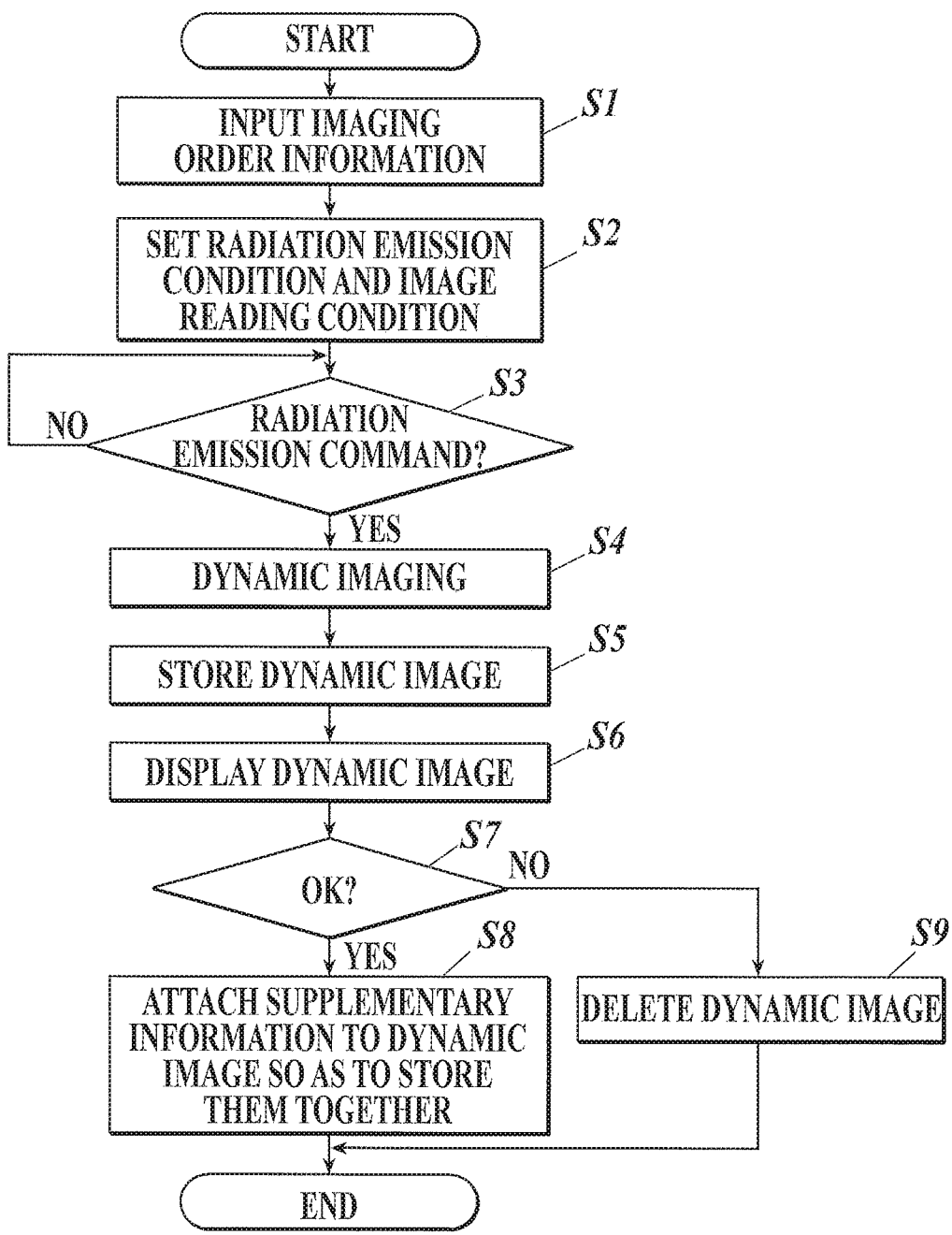
FIG. 3 is a flowchart showing an imaging control process performed by a control unit shown in FIG. 2.

FIG. 3 shows the flow of the imaging control process performed by the console 2 in response to operations thereon by a photographer such as a radiologist. The imaging control process is performed by the control unit 21 in cooperation with the imaging control process program stored in the storage unit 22.

First, a radiologist or the like operates the operation unit 23 of the console 2 so as to input imaging order information which includes patient information (name, height, weight, build, age, sex, etc. of a patient) on an imaging target (i.e., a subject H), an examination target site and an analysis target (i.e., a characteristic amount to calculate) (Step S1).

Next, the control unit 21 reads the radiation emission conditions from the storage unit 22 so as to set them in the radiation emission control unit 12 through the communication unit 25, and also reads the image reading conditions from the storage unit 22 so as to set them in the reading control unit of the FPD cassette 4 through the communication unit 25 (Step S2).

Next, the control unit 21 waits for a radiation emission command to be input from the exposure switch 13 (Step S3). During this period of time, the radiologist performs positioning of the patient. More specifically, the radiologist positions the subject H such that the front (or back or side) chest of the subject H faces the radiation source 11. In addition, the radiologist positions the FPD cassette 4 on the side of the subject H opposite to the side which faces the radiation source 11 in such a way as to face the radiation source 11 via the subject H. When completes the positioning, the radiologist operates the exposure switch 13 so as to input a radiation emission command.

When receives the radiation emission command input from the exposure switch 13 (Step S3; YES), the control unit 21 outputs an imaging start command to the radiation emission control unit 12 and to the FPD cassette 4 to start dynamic imaging (Step S4). That is, the radiation source 11 emits radiation at pulse intervals set in the radiation emission control unit 12 in the case of pulse emission or continuously emits radiation without a break at a dose rate set in the radiation emission control unit 12 in the case of continuous emission, and accordingly the FPD cassette 4 obtains a series of frame images. Preferably, the number of frame images taken by one dynamic imaging covers at least one cycle of respiration.

Each time a frame image is obtained by imaging, the obtained frame image is input from the FPD cassette 4 to the console 2 through the communication unit 25 and stored in the storage unit 22, the frame image being correlated with a number indicating what number in the imaging order the frame image has been taken (Step S5), and also displayed on the display unit 24 (Step S6). The radiologist checks the positioning or the like with the displayed dynamic image and determines whether the dynamic image obtained by dynamic imaging is suitable for diagnosis (Imaging OK) or re-imaging is necessary (Imaging NG). Alternatively, after dynamic imaging finishes, automatically or in response to an operation through the operation unit 23, all the frame images obtained by dynamic imaging may be read from the storage unit 22 and successively displayed on the display unit 24 by being switched (as a video) or displayed on the display unit 24 by being arranged next to one another. Then, the radiologist determines whether the dynamic image obtained by dynamic imaging is suitable for diagnosis (Imaging OK) or re-imaging is necessary (Imaging NG). When determines either one of the "Imaging OK" and "Imaging NG", the radiologist operates the operation unit 23 so as to input the determination result.

When the determination result "Imaging OK" is input by the radiologist making a predetermined operation through the operation unit 23 (Step S7; YES), the control unit 21 attaches, to the respective frame images obtained by dynamic imaging and stored in the storage unit 22 (e.g., writes, in the header region of the image data in DICOM format), supplementary information which includes an ID to identify the dynamic image, the patient information, the examination target site, the analysis target, the radiation emission conditions, the image reading conditions, and the respective numbers indicating what number in the imaging order the respective frame images have been taken (Step S8), and then the imaging control process ends. On the other hand, when the determination result "Imaging NG" is input by the radiologist making a predetermined operation through the operation unit 23 (Step S7; NO), the control unit 21 deletes the frame images from the storage unit 22 (Step S9), and then the imaging control process ends.

Next, the dynamic analysis process performed on the dynamic image, which is stored in the storage unit 22 by the above imaging control process, is described.

During or after surgeries, patients are often connected to medical tubes, such as central venous catheters and drainage tubes. Conventionally, when dynamic X-ray imaging is performed to image the chests of these patients who are subjects and dynamic analysis is performed on the obtained dynamic images, movements of the medical tubes accompanying body movement, pulsation and/or respiration of the patients become artifacts in the analysis results.

Hence, in the dynamic analysis process of this embodiment, the control unit 21 performs, before dynamic analysis, a product attenuation process on the dynamic image so as to attenuate an image signal component(s) of a product(s) such as a metical tube(s), and then performs dynamic analysis on the obtained dynamic image.

Figure 4:
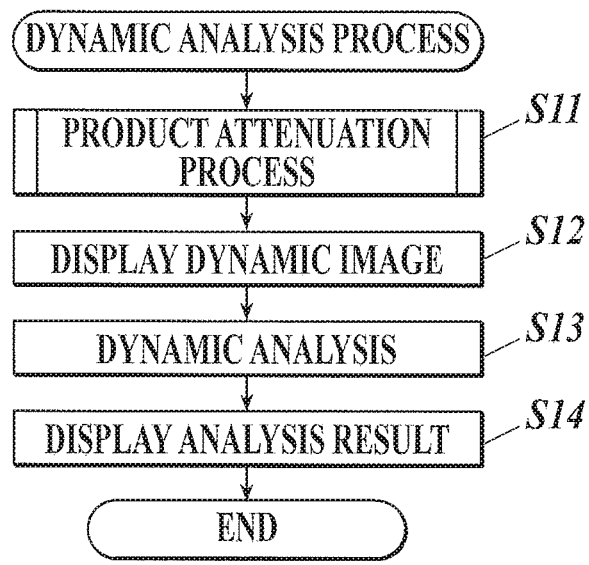
FIG. 4 is a flowchart showing a dynamic analysis process performed by the control unit shown in FIG. 2.

FIG. 4 shows the flow of the dynamic analysis process performed by the console 2. The dynamic analysis process is performed by the control unit 21 in cooperation with the program stored in the storage unit 22.

First, the control unit 21 preforms the product attenuation process on the respective frame images (Step S11).

Figure 5:
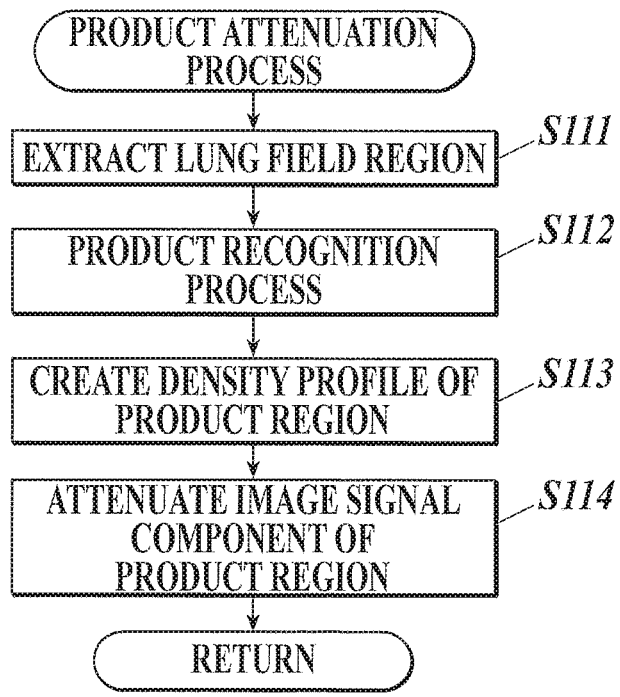
FIG. 5 is a flowchart showing a product attenuation process performed at Step S11 shown in FIG. 4.

FIG. 5 shows the flow of the product attenuation process performed at Step S11. The product attenuation process is performed by the control unit 21 in cooperation with the program stored in the storage unit 22.

In the product attenuation process, first, the control unit 21 extracts the lung field region from the respective frame images (Step S111).

As a method for extracting the lung field region, any method can be used. For example, a threshold value is obtained from a histogram of signal values (density values) of pixels of the frame images by discriminant analysis, and a region having a higher signal value(s) than the threshold value is extracted as a lung field region candidate, and then edge detection is performed on around the border of the extracted lung field region candidate, and points where the edge is the maximum are extracted along the border in a small region around the border, whereby the border of the lung field region is extracted.

Next, the control unit 21 performs a product recognition process on the lung field region extracted from the respective frame images so as to recognize a product region(s) (Step S112).

Medical tubes are representative of products placed in the bodies of patients. Hence, hereinafter, a case is described where the region of a thin tube-shaped object is recognized as a product region. However, products are not limited thereto.

At Step S112, in order to recognize the product region, the control unit 21 first generates an edge-enhanced image of a thin tube-shaped object (product), and then performs edge detection on the edge-enhanced image.

More specifically, the control unit 21 first performs a sharpening process such as a spatial frequency enhancement process on the lung field region extracted from the respective frame images so as to generate an image enhancing the edge of the product (i.e., the edge-enhanced image).

At the time, a GUI (Graphical User Interface) for a user to input the size (thickness/diameter) of the used product from the operation unit 23 may be displayed on the display unit 24, and a filter to enhance a spatial frequency for the size (thickness/diameter) of the product input in response to an operation through the operation unit 23 is used to enhance the edge of the product having the input size (thickness/diameter). This can improve accuracy of product recognition.

Alternatively, a GUI for a user to input the type of the product, which is inserted into the patient, from the operation unit 23 may be displayed on the display unit 24 so as to enhance the edge of the product according to the input type of the product. For example, if the product is a central venous catheter, generally used for adults is a catheter having a thickness (diameter) of about 1 to 3 mm, if the product is a chest drainage tube, generally used for adults is a tube having a thickness (diameter) of about 4 to 15 mm, and if the product is a tracheal tube although it is not often captured in the lung field region, generally used for adults is a tube having a thickness (diameter) of about 6 to 9 mm. Hence, for example, if the input type of the product is the central venous catheter for adults, a filter to enhance a spatial frequency of about 1 to 3 mm is used for edge enhancement. More specifically, in order to enhance two edges formed by the lateral face sides of the tube (both ends in the diameter direction), it is preferable to set a size $D*c$ (here, $0<c<1$) smaller than the thickness (diameter) $D$ of the tube as a spatial frequency to be enhanced by a filter. This can improve accuracy of product recognition. For edge enhancement, a Sobel filter or a Canny filter may also be used.

Alternatively, movement of the product between the frame images of the dynamic image caused by movement of the subject H may be utilized to enhance the edge of the product. That is, a difference value(s) between the frame images of the dynamic image adjacent to one another (hereinafter may be referred to as "inter-frame difference values") may be calculated to enhance the edge of the product.

After generated, the edge-enhanced image is binarized with a predetermined threshold value so as to generate an edge-detected image in which, for example, "1" is assigned to edge candidate points (pixels) of the product and "0" is assigned to the other points (pixels). Preferably, an expansion process is performed on the edge-detected image so as to connect the edge candidate points close to one another, thereby form a mass thereof. In the expansion process, preferably, a parameter(s) suitable for the size of the product is used. For example, if the product is a tube, the edge candidate points within a predetermined distance corresponding to the thickness/diameter of the tube are connected so as to unite the edge candidate points of two lines formed by the lateral face sides of the tube (both ends in the diameter direction) into a mass. Thereby, the edge candidate points can be expressed as one line. Further, in order to easily detect the shape of the line, which is formed of the connected edge coordinate points, by the below-described contour detection process, preferably, a thinning process is performed on the edge-detected image, which is formed of the edge candidate points connected by the expansion process, so as to express the line as a line of edge candidate points having a width of one point (pixel). Next, the contour detection process is performed on the edge-detected image so as to detect the edge candidate points as a straight line(s) and a curve(s) by generalized Hankel Fourier transformation with a straight line/arc/broken ellipse as a model, polynomial approximation with a spline interpolation method, a dynamic contour method, or the like. In order to simplify the shape of the line to detect as well as in order to reduce the degree of the curve(s), preferably, first, the edge-detected image is divided into several to several ten blocks having the same size, next, the contour detection process is performed on the respective blocks, and then the blocks are combined to form an image having the original size. Then, a region enclosed by the contours (straight line(s) and curve(s)) detected by the contour detection process is recognized as the product region. When the product is a tube, preferably, the expansion process is performed on the contour-detected image such that the width formed of the detected contours corresponds to the thickness/diameter of the tube, and the expanded contour(s) is recognized as the product region. When the product is a tube, alternatively, without the contour detection process, the expansion process may be performed on the thinned edge-detected image such that the width formed of the thinned edge candidate points corresponds to the thickness/diameter of the tube, and the expanded edge candidate points are regarded as the product region. Omission of the contour detection process can shorten the processing time for recognition of the product region.

Bone regions of ribs, collarbone and so forth in frame images are easily mistakable for product regions. Hence, it is possible to, before the above-described recognition of the product region, recognize bone region(s) of ribs, collarbone and so forth from the respective frame images, attenuate the image signal component of the recognized bone region, and recognize the product region from the region except the bone region in the respective frame images.

Bone regions can be recognized, for example, by template matching with prepared rib template, collarbone template and so forth or curve fitting after edge detection as described in U.S. Patent Application Publication NO. 2014/0079309. Further, whether the recognized bone regions are correct may be carefully inspected with preliminary knowledge about the bone structures of ribs, collarbone and so forth, such as their positions, shapes, sizes, density gradients and directions, and when it is determined that there is an excessively extracted portion(s), the portion can be removed from the bone region(s).

The image signal component of the bone region can be attenuated, as with Steps S113 and S114 described below, by creating a density profile of the bone region for each frame image and subtracting, from the frame image, the value(s) of the density profile from which noise or the like has been removed.

Alternatively, it is possible to, after the above-described recognition of the product region, recognize a bone region(s) from the respective frame images, and recognize the region except the recognized bone region in the recognized product region as the final product region.

Figure 6:
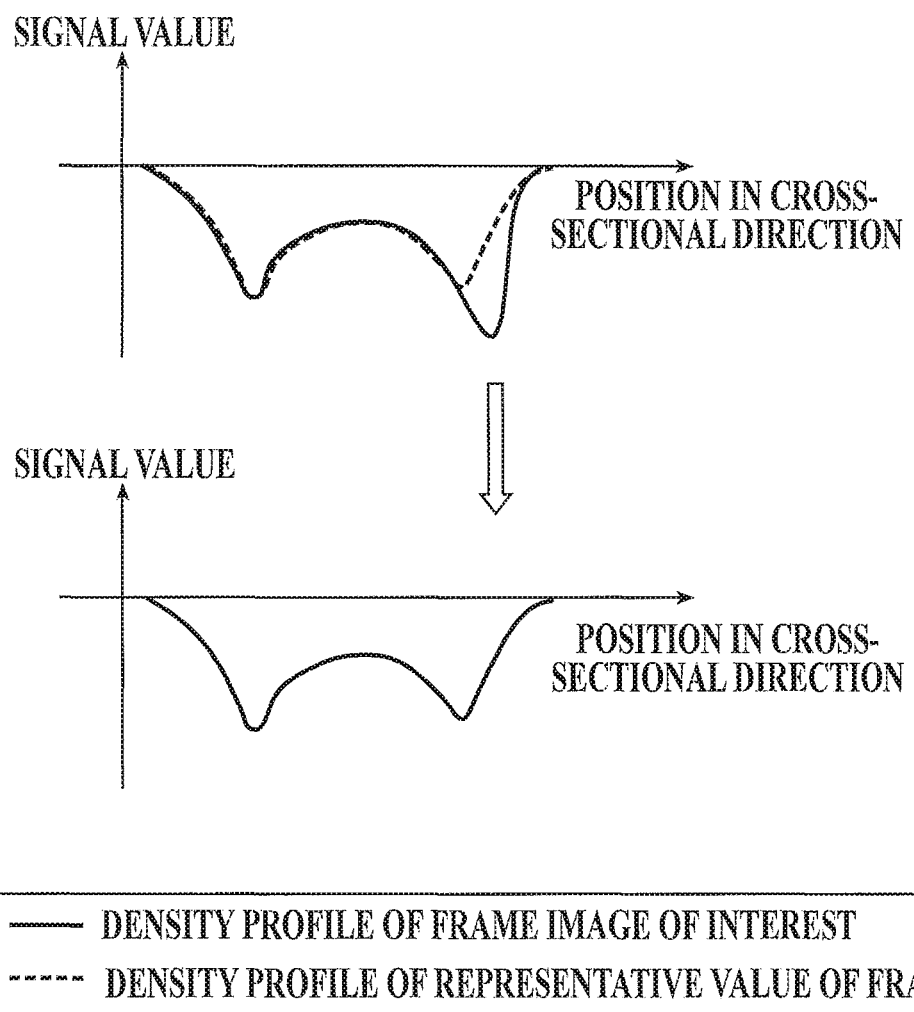
FIG. 6 schematically shows a density profile of a product region in a cross-sectional direction and correction thereof.

Next, the control unit 21 creates, with respect to each of the frame images, a density profile of the recognized product region (Step S113). More specifically, the control unit 21 creates, with respect to each of the frame images, a density profile(s) of the recognized product region(s) in a cross-sectional direction. For example, in the case where the product is a tube, a density profile in a line which is perpendicular to a running direction of the tube is the density profile in the cross-sectional direction. The density profile of the product region in the cross-sectional direction is, as shown in FIG. 6, created by plotting density change in the product region in the cross-sectional direction with the horizontal axis showing the position in the cross-sectional direction and the vertical axis showing the signal value (pixel value).

Preferably, the density profile of the product region in the cross-sectional direction created for a frame image is compared with the density profiles created for frame images before and after the frame image so as to correct the value(s) to subtract to be approximately the same as those for the frame images before and after the frame image.

For example, with respect to each pixel of a frame image of interest, the value of the density profile of the product region in the cross-sectional direction in the frame image of interest is compared with (i) the representative value (e.g., the median or the average) obtained from the density profiles of the product region in the cross-sectional direction in the frame images before and after the frame image of interest or (ii) the value of the density profile of the product region in the cross-sectional direction in its adjacent frame image (frame image immediately before or after the frame image of interest), and if difference therebetween is equal to or more than a predetermined threshold value, the value is replaced by the compared value (representative value) for example, whereby the density profile of the frame image of interest is corrected. Alternatively, as shown in FIG. 6, agreement of waveforms at a position may be evaluated by obtaining correlation or the like at the position (e.g., a cross correlation coefficient) between the waveform showing the density profile of the product region in the cross-sectional direction in a frame image of interest and (i) the waveform obtained from the representative value (e.g., the median values) of the density profiles in the frame images before and after the frame image of interest or (ii) the waveform showing the density profile in its adjacent frame image (frame image immediately before or after the frame image of interest), and if the agreement (correlation value) is lower than a predetermined threshold value, the waveform is replaced by the compared waveform for example, whereby the density profile of the frame image of interest in the cross-sectional direction is corrected at the position and hence corrected overall.

Thereby, at Step S114, the value(s) of the density profile to subtract from a frame image is approximately the same as those to subtract from the frame images before and after the frame image. This can prevent a product-attenuated frame image from being greatly different from the product-attenuated frame images before and after the product-attenuated frame image. Hence, for example, when a difference value between corresponding pixels or between corresponding regions of different frame images, such as frame images adjacent to one another, is calculated, the difference value is not affected by variation in the product attenuation process performed on the respective frame images. Consequently, only change in the lung field caused by respiration or bloodstream can be extracted with higher accuracy.

Next, the control unit 21 generates images with the image signal component of the product attenuated (i.e., the product-attenuated frame images) by applying a low-pass filter to the created density profiles so as to remove a high spatial frequency component such as noise from the density profiles and subtracting, from the respective frame images, the values of their respective density profiles from which noise or the like has been removed (Step S114).

If the product attached to the patient is a thin product having a thickness (diameter) of less than 1 mm, such as a central venous catheter for children, Steps S112 to S114 may be omitted because the product hardly affects the analysis result. Instead, smoothing may be performed to attenuate the image signal component of the product with a smoothing filter for a block size of each side several times the diameter of the product.

When the product attenuation process ends, the dynamic analysis process returns to Step S12 in FIG. 4, so that the control unit 21 displays the dynamic image after the product attenuation process on the display unit 24 (Step S12). As displaying the dynamic image, the frame images after the product attenuation process may be displayed on the display unit 24 by being switched in order (as a video), or displayed on the display unit 24 by being arranged next to one another.

Displaying the dynamic image after the product attenuation process allows a user to check what images are input for dynamic analysis. At Step S12, preferably, the dynamic image after the product attenuation process and the dynamic image before the product attenuation process are displayed (i) in a switchable manner in response to operations through the operation unit 23 or (ii) next to each other. Displaying the dynamic image after the product attenuation process and the dynamic image before the product attenuation process to be comparable with each other allows a user to check and determine how the dynamic image has been changed by the product attenuation process and if the dynamic image after the product attenuation process is suitable for dynamic analysis.

Next, the control unit 21 performs dynamic analysis of the chest on the dynamic image after the product attenuation process (Step S13).

The dynamic analysis of the chest includes an analysis of calculating a characteristic amount indicating a local motion (movement) of the lung field and an analysis of calculating a characteristic amount indicating a motion of the entire lung field, and also includes an analysis targeted at the ventilation function and an analysis targeted at the bloodstream function.

There are several ways of the analysis of calculating the characteristic amount indicating local signal change in ventilation in the lung field, and one of these is calculation of images showing difference between frame images (hereinafter "inter-frame difference images"). The inter-frame difference images on ventilation can be calculated by performing the following processes on the frame images.

Binning Process→Low-pass Filter Process in Time Line Direction→Inter-frame Difference Process→Noise Removal Process The binning process is a process of, in each frame image, dividing the image region into small regions each composed of a pixel block having a predetermined size, and with respect to each small region, calculating the representative value such as the average (averaging) of signal values of pixels composing the small region. The representative value is not limited to the average and hence may be the median or the mode. Preferably, the size of the pixel block is suitable for a site to be analyzed and/or a characteristic amount calculated by the analysis for improvement of accuracy of analysis. Setting the size of the pixel block at an integral multiple of a gap (distance) between ribs can make the proportion of ribs present in the pixel block approximately the same even if the ribs are moved by respiration, and therefore can reduce density change in the pixel block caused by movement of the ribs by respiration, and accordingly can improve accuracy of analysis.

The low-pass filter process in the time line direction is a process of extracting temporal change in the signal value in ventilation; for example, filtering at a cutoff frequency of 0.5 Hz.

The inter-frame difference process is a process of correlating small regions of a series of frame images at the same pixel (regions output from the same detection element in the FPD cassette 4) with one another, and with respect to each small region in the frame images, calculating inter-frame difference values, thereby generating inter-frame difference images.

In the case where a still image of inter-frame difference images is generated, density change in the entire lung field region or positional change of the diaphragm is analyzed so as to calculate an inhalation period and an exhalation period in a series of frame images, and, with respect to each small region in the frame images, absolute values of positive inter-frame difference values are added up as to the inhalation period, and absolute values of negative inter-frame difference values are added up as to the exhalation period, whereby a still image of inter-frame difference images is generated.

At an abnormal part in ventilation, the inter-frame difference value is small. Hence, a part locally abnormal in ventilation can be identified by outputting the inter-frame difference images.

There are several ways of the analysis of calculating the characteristic amount indicating local signal change in bloodstream in the lung field, and one of these is calculation of inter-frame difference images. The inter-frame difference images on bloodstream can be calculated by performing the following processes on the frame images.

Binning Process→High-pass Filter Process in Time Line Direction→Inter-frame Difference Process→Noise Removal Process The high-pass filter process in the time line direction is a process of extracting temporal change in the signal value in bloodstream; for example, filtering at a cutoff frequency of 0.7 Hz. The other processes are the same as those described above for the inter-frame difference images on ventilation.

At an abnormal part in bloodstream, the inter-frame difference value is small. Hence, a part locally abnormal in bloodstream can be identified by outputting this inter-frame difference images.

The analysis result is correlated with the patient information and the frame images, based on which the analysis is made, and stored in the storage unit 22.

Next, the control unit 21 displays the analysis result, obtained at Step S13, on the display unit 24 (Step S14), and then the dynamic analysis process ends.

For example, in the case where the inter-frame difference images are obtained as the analysis result, the small regions in the inter-frame difference images are shown in brightness or color according to their inter-frame difference values, and the inter-frame difference images are displayed on the display unit 24 as a video or by being arranged next to one another. Alternatively, a still image of inter-frame difference images may be generated. Then, the small regions in the still image are shown in brightness or color according to their inter-frame difference values, and the still image is displayed on the display unit 24.

Further, the analysis result such as the image(s) in which the inter-frame difference values are shown in color and the dynamic image before the analysis may be displayed on the display unit 24 by being arranged next to one another, displayed at the same position on the display unit 24 switchably at proper timing, or displayed on the display unit 24 by being superimposed with different transmittances. This kind of display makes it easy to compare the analysis result with the dynamic image before the analysis, and accordingly makes it easy to understand, for example, what structure's movement in the dynamic image before the analysis is the factor in generating the local value in the analysis result such as the inter-frame difference images, and enables more accurate understanding of the state of the diseased site.

Further, the inter-frame difference images on ventilation and the inter-frame difference images on bloodstream may be displayed on the display unit 24 by being arranged next to one another, displayed at the same position on the display unit 24 switchably at proper timing, or displayed on the display unit by being superimposed with different transmittances. This kind of display makes it easy to compare an abnormal part in ventilation with an abnormal part in bloodstream, and accordingly enables more accurate understanding of the state of the diseased site.

Further, the result of CAD (Computer-Aided Diagnosis), which is used for cancer diagnosis support or the like, and the analysis result such as the image(s) in which the inter-frame difference values are shown in color may be displayed on the display unit 24 by being arranged next to one another, displayed at the same position on the display unit 24 switchably at proper timing, or displayed on the display unit 24 by being superimposed with different transmittances. This kind of display makes it easy to compare the CAD result in which, for example, region(s) resembling a tuber or a tumor shadow in the lung field is marked with the analysis result such as the image(s) in which the inter-frame difference values are shown in color, and accordingly enables more accurate understanding of the state of the diseased site based on determination of whether the marked region in the CAD result agrees with the local value in the analysis result such as the image(s) in which the inter-frame difference values are shown in color.

There is another way of the analysis of calculating the characteristic amount indicating local signal change in ventilation or bloodstream in the lung field, which is described in Japanese Patent Application Publication No. 2010-268979. It is an analysis of calculating, with respect to each of small regions into which the lung field region is divided, phase delay time of (i) temporal change in the pixel signal value to (iia) temporal change (reference temporal change) in the index value indicating respiration, such as the position (up and down) of the diaphragm, in the case of ventilation or (iib) temporal change (reference temporal change) in the index value indicating pulsation of the heart, such as a signal value at the position of the cardiac wall or in the heart region, in the case of bloodstream, so as to calculate, with respect to which region in the lung field region, how much temporal change in the pixel signal value delays. This calculation result may be displayed on the display unit 24.

There is also another way thereof. It is an analysis of calculating, with respect to each of small regions into which the lung field region is divided, a cross correlation coefficient between (i) the waveform showing temporal change in the pixel signal value and (iia) the waveform (reference waveform) showing temporal change in the index value indicating respiration, such as the position (up and down) of the diaphragm, in the case of ventilation or (iib) the waveform (reference waveform) showing temporal change in the index value indicating pulsation of the heart, such as a signal value at the position of the cardiac wall or in the heart region, in the case of bloodstream, so as to calculate if a correlation exists therebetween. This calculation result may be displayed on the display unit 24.

Based on the above-described phase delay time or cross correlation coefficient, for example, a region where the phase delay time is about a half of a cycle of respiration or pulsation and the phase is almost inversed or a region where the cross correlation coefficient is smaller than a predetermined value may be recognized as a region where change in the signal value occurs by movement of a structure(s) such as ribs, namely, a bone region, and as described above, the image signal component of the bone region may be attenuated by creating a density profile of the bone region for each frame image and subtracting, from the frame image, the value(s) of the density profile from which noise or the like has been removed.

Further, about a subject H who is considered to undergo a surgery such as pneumonectomy, it is possible to: in the analysis result displayed on the display unit 24, such as the image(s) in which the inter-frame difference values are shown in color, select a region in the lung field region, for example, a pneumonectomy region corresponding to a pneumonectomy range in the lung field, by a user operating the operation unit 23 or the like; calculate, as a characteristic amount L of ventilation or bloodstream in a region except the selected region from the entire lung field region, an integrated value of inter-frame difference values of the region except the selected region from the entire lung field region, for example; calculate, as a characteristic amount E of ventilation or bloodstream in the entire lung field region, an integrated value of inter-frame difference values of the entire lung field region, for example; calculate a ratio of these characteristic amounts L and E by dividing the characteristic amount L by the characteristic amount E; and display this result on the display unit 24 as the analysis result. By selecting the pneumonectomy region as the above-described region to select, the characteristic amount L can be regarded as the amount of ventilation or bloodstream after pneumonectomy, and the characteristic amount E can be regarded as the amount of ventilation or bloodstream before pneumonectomy. Hence, the calculated ratio of the characteristic amounts L and E can be regarded as a ratio of the amount of ventilation or bloodstream after pneumonectomy to the amount of ventilation or bloodstream before pneumonectomy, namely, a rate indicating how much the amount of ventilation or bloodstream changes by pneumonectomy. This allows a user, before pneumonectomy, to quantitatively estimate the state after pneumonectomy.

Further, the console 2 may be configured to receive a measurement result(s) of a different examination(s) on the subject H input through the operation unit 23 or the communication unit 25, calculate a value obtained by multiplying the received measurement result of the different examination on the subject H by the calculated ratio of the characteristic amounts L and E, and display the calculated value on the display unit 24 as the analysis result. For example, as the above-described region to select, the pneumonectomy region is selected, and as the measurement result of the different examination on the subject H, the result of spirometry before pneumonectomy is input, whereby the value obtained by multiplying the measurement result of the different examination on the subject H by the calculated ratio of the characteristic amounts L and E can be regarded as an estimation value of spirometry after pneumonectomy. This allows a user, before pneumonectomy, to estimate the result of spirometry after pneumonectomy as the state after pneumonectomy, and based on this result, the user can appropriately determine whether to perform pneumonectomy on the subject H to surgically remove the selected region.

Preferably, at Step S13, dynamic analysis is performed not only on the dynamic image after the product attenuation process but also on the dynamic image before the product attenuation process, and at Step S14, the analysis result of the dynamic image after the product attenuation process and the analysis result of the dynamic image before the product attenuation process are displayed (i) in a switchable manner in response to operations through the operation unit 23 or (ii) next to each other. Displaying the analysis result of the dynamic image after the product attenuation process and the analysis result of the dynamic image before the product attenuation process to be comparable with each other allows a user to check and determine how the analysis result of the dynamic image has been changed by the product attenuation process and if the analysis result of the dynamic image after the product attenuation process is appropriate.

In the above, the imaging order information is input into the console 2 by a radiologist. However, the imaging order information may be input into the console 2 from a terminal such as an RIS (Radiology Information System) connected via a cable/wireless network.

Further, when the imaging order information is input into the console 2, preferably, all or some of frame images of previously taken dynamic image(s) of the patient, who is the imaging target, and the radiation emission conditions and the image reading conditions attached to the dynamic image(s) are (i) read from the console 2 or an image storage server such as a PACS (Picture Archiving and Communication System) connected to the console 2 via a cable/wireless network and (ii) displayed on the display unit 24. Displaying, on the console 2, all or some of the frame images of the previously taken dynamic image(s) of the patient, who is the imaging target, and the radiation emission conditions and the image reading conditions attached to the dynamic image(s) makes it easy to image the patient under the same positioning, posture, radiation emission conditions and image reading conditions as those in the previous imaging, and hence serves for obtaining a dynamic image which is more easily comparable with the previously taken dynamic image(s). Then, in order to make previously taken dynamic images readily referable, preferably, the console 2 stores therein particular frame images of dynamic images or reversibly/irreversibly compressed images of the whole or parts of dynamic images for a long period of time.

Further, in the case of dynamic imaging without a grid for removal of scattered rays, preferably, before the product attenuation process, a scattered ray removal process to estimate scattered ray components about frame images and remove the scattered ray components from the respective frame images is performed. This can improve contrast in the dynamic image and improve accuracy of the product recognition process in the product attenuation process.

Further, there is a case where the amount of radiation emitted (hereinafter "radiation emission amount") from the radiation generation apparatus 1 for each frame image changes during dynamic imaging, and this temporal change in the radiation emission amount may cause errors in the analysis result. Hence, before the product attenuation process, preferably, a radiation-emission-amount temporal-change correction process is performed on the respective frame images so as to cancel the temporal change in the radiation emission amount per frame image. This correction process may be performed by the console 2 employing a method of obtaining information on the radiation emission amount for each frame image from the radiation generation apparatus 1 and dividing the pixel value of each frame image by a value proportional to the radiation emission amount for the frame image. Alternatively, the correction process may be performed by recognizing a no-notion region, such as a directly irradiated region or a region where a subject H is captured but approximately still, from the respective frame images and performing the correction process according to the pixel value of the recognized no-motion region. This can eliminates influence of the temporal change in the radiation emission amount on the characteristic amount related to the ventilation function or the bloodstream function, and accordingly can improve the diagnostic accuracy based on the analysis result of the dynamic image.

In order that this correction process works properly, preferably, each time a frame image is obtained during dynamic imaging, or immediately after dynamic imaging, the control unit 21 of the console 2 (i) determines whether the no-motion region, such as a directly irradiated region or a region where a subject H is captured but approximately still, is contained in the frame image, and (ii) when determines that the no-motion region is not contained therein, displays an alarm message on the display unit 24 so as to urge a user to perform re-imaging or the like.

Further, the console 2 may determine whether alignment of the FPD cassette 4 with the radiation source 11 and positioning of a subject H are appropriate and also determine a parameter(s) for image processing to display the dynamic image before analysis, by still image shooting for positioning check (scout shooting) performed immediately before dynamic imaging starts or by analysis of one to several frame images taken immediately after dynamic imaging starts. If the frame image(s) taken immediately after dynamic imaging starts are analyzed, preferably, each time a frame image is obtained during dynamic imaging, the frame image is analyzed in almost real time. Whether alignment of the FPD cassette 4 with the radiation source 11 and positioning of a subject H are appropriate is determined as follows: in the case of dynamic imaging of the chest of a subject H, the control unit 21 performs image processing and thereby first recognizes a through region which is directly irradiated with radiation (i.e., the directly irradiated region) and a subject region, next recognizes the lung field region and the mediastinum region from the subject region, and further recognizes, from the mediastinum region, a spinous process(es), which is present in the vertically arranged vertebrae, and pediculus arcus vertebrae, between which the spinous process is interposed; and then automatically performs measurement to determine whether the spinous process is located at the center of the recognized pediculus arcus vertebrae and thereby determines whether the spinous process is in the middle of the pediculus arcus vertebrae. When it is determined that the spinous process is not in the middle of the pediculus arcus vertebrae, it is assumed that radiation is emitted not perpendicularly but obliquely to the surface of the FPD cassette 4, and accordingly a message to change alignment of the FPD cassette 4 with the radiation source 11 is displayed on the display unit 24. At the time, it is far preferable that the vertebra where the spinous process and the pediculus arcus vertebrae are recognized is enlargedly displayed on the display unit 24 because this makes it easy for a user to grasp how much the radiation source 11 should be moved.

Further, the console 2 or the FPD cassette 4 may recognize the lung field region by still image shooting for positioning check (scout shooting) performed immediately before dynamic imaging starts or by analysis of one to several frame images taken immediately after dynamic imaging starts, and determine a region of "circumscribed quadrilateral of the recognized lung field region×α (α>1)" as a target region, and the FPD cassette 4 may read only the determined target region in obtaining the following frame images or may read the entire region but transfer only the determined target region in the read entire region to the console 2. The target region may be determined/set to contain a predetermined area (size) of the directly irradiated region corresponding to a region of the FPD cassette 4 directly irradiated with radiation emitted from the radiation source 11. Limiting the region read by the FPD cassette 4 or the region to transfer from the FPD cassette 4 to the console 2 to a certain region can reduce the amount of electricity consumed by the reading or the transfer and also can reduce the storage capacity of a storage unit of the FPD cassette 4 and/or the storage capacity of the storage unit 22 consumed by storing image data.

Further, in order to prevent blurring caused by movements (motion artifacts) of the radiation source 11 and a subject H, preferably, the radiation generation apparatus 1 emits radiation by pulse emission from the radiation source 11. If the radiation generation apparatus 1 only has a function of continuously emitting radiation without a break (continuous emission) from the radiation source 11, the radiation generation apparatus 1 may be provided, at a radiation exit of the radiation source 11, with a not-shown aperture stop part to reduce the irradiated field of radiation. The aperture stop part has a shutter to completely block output of radiation, and drives opening/closing of the shutter at desired timing, and thereby changes continuous emission to pulse emission. Consequently, the radiation generation apparatus 1 can emit radiation by pulse emission. Preferably, the aperture stop part and the FPD cassette 4 are configured to be in sync such that timing at which the shutter of the aperture stop part is opened to emit pulsed radiation is within the accumulation time of the FPD cassette 4. Further, the aperture stop part having the shutter opening/closing mechanism is, preferably, configured to be externally attachable to the radiation source 11. Hence, even if a radiation generation apparatus installed in a facility is for still image shooting and can emit radiation only for a short time but can realize continuous emission by emitting radiation (i.e., single radiation) longer than usual, the radiation generation apparatus can realize pulse emission at low cost without being entirely replaced, with the attachable aperture stop part being externally attached to the radiation source 11 thereof. Many radiation generation apparatuses for still image shooting are apparatuses having a minimum settable tube current of 10 mA or 20 mA, but in the case of dynamic imaging, in order to reduce the total exposure dose of a subject, a dose rate of radiation emitted to a subject should be kept low, for example, at a dose rate of radiation emitted when the tube current is set at about 0.5 to 3 mA. Then, the aperture stop part is externally attached to the radiation source 11 of such a radiation generation apparatus for still image shooting, and cyclically closes the shutter to block the single radiation, which is emitted from the radiation source 11 longer than usual, whereby pulse emission is realized. Accordingly, the dose rate of radiation emitted to a subject from the radiation generation apparatus for still image shooting can be reduced to a dose rate suitable for dynamic imaging, and the total exposure dose of the subject can be kept low. In order to further reduce the dose rate, the aperture stop part may have a structure to attach an added filter to the radiation exit of the aperture stop part.

Further, the visiting or portable radiation generation apparatus 1 is movable and compact and therefore often has a long rising time for the tube voltage to rise to around a set value immediately after radiation emission starts and a long falling time for the tube voltage to fall to almost 0 immediately after radiation emission ends. During these periods of time that the tube voltage rises to around the set value and the tube voltage falls to almost 0, radiation having a low tube voltage is emitted, and hence a frame image(s) meeting a desired image quality for analysis cannot be generated, and the exposure dose of a subject H increases for nothing. Hence, preferably, the aperture stop part has a function of blocking radiation by closing the shutter with the shutter opening/closing mechanism when the tube voltage is lower than a desired value, such as immediately after radiation emission starts or immediately after radiation emission ends. This allows only radiation having a tube voltage at which frame images suitable for analysis are generated to be emitted to a subject H, and hence can reduce or eliminate unnecessary exposure of the subject H to radiation. Alternatively, control may be made not to perform reading of the FPD cassette 4, storage of image data into the storage unit of the FPD cassette 4 and/or sending of image data from the FPD cassette 4 to the console 2 through the communication unit 25 while a predetermined number of frame images are taken immediately after radiation emission starts or for a predetermined period of time immediately after radiation emission starts. This can reduce power consumption of the FPD cassette 4 during emission of radiation having a low tube voltage at which frame images unsuitable for analysis are generated, and if the FPD cassette 4 is driven by a battery, can reduce consumption of the battery too. Further, because frame images unsuitable for analysis are not stored in the storage unit of the FPD cassette 4, the storage capacity of the storage unit of the FPD cassette 4 can be effectively used.

As described above, immediately after radiation emission starts/ends, the tube voltage is lower than a desired value, and radiation suitable for analysis is not emitted from the radiation source 11, so that the aperture stop part closes the shutter with the shutter opening/closing mechanism, thereby blocking radiation emitted from the radiation source 11. Then, during a portion of this period of time, the FPD cassette 4 may obtain one to several frame images, and these frame image(s) obtained by the FPD cassette 4 without being irradiated may be used as image data for offset correction to remove offset values resulting from dark current superposed on the frame images obtained by the FPD cassette 4 with being irradiated. This makes it possible to obtain image data for the offset correction at a time quite close to a period of time that the FPD cassette 4 is being irradiated, and accordingly increase accuracy of the offset correction to remove the offset values and obtain frame images (i.e., a dynamic image) suitable for analysis and diagnosis.

Further, in the case of dynamic imaging of the breathing state of the chest of a subject H, respiration of the subject H may be measured with a noncontact sensor such as a microwave sensor outputting radio waves and receiving reflected waves from the surface of the subject H, and respiration information on the subject H may be displayed on the display unit 24 of the console 2 in real time. Extraction of respiration information on a subject H with a sensor separate from the FPD cassette 4 allows a user to monitor respiration of the subject H even not during radiation emission, and allows the user, according to the respiration of the subject H, to determine timing of the start of radiation emission. The respiration information such as the phase of respiration obtained with a sensor separate from the FPD cassette 4 is preferably attached to and stored with its dynamic image or the analysis result of the dynamic image. However, in order to separately display the image data and the respiration information, which are once combined, on a server such as a PACS or a terminal such as a viewer by transferring the combined data thereto, the server or terminal needs to have the structure of the combined data in advance, and hence type of server or terminal which can separately display the image data and the respiration information is very limited. Then, the respiration information such as the phase of respiration may be embedded in its corresponding frame image(s) in the image data in the form of text information as an annotation(s) or in the form of graphics as waveform data. This allows a general-purpose server or terminal which reads the combined data to separately display the image data and the respiration information such as the phase of respiration, without limiting the type of the server or terminal.

Further, the visiting or portable radiation generation apparatus 1 is movable and compact, and hence the maximum radiation emission time is short, so that there is a case where the radiation generation apparatus 1 cannot take images of one cycle of respiration by one dynamic imaging. In such a case, for example, it is possible that respiration of the subject H is monitored even not during radiation emission with a sensor separate from the FPD cassette 4 as described above; the phase at the end of radiation emission in the first dynamic imaging is stored; and, in the second dynamic imaging, control is made, based on the output of the sensor, not to start radiation emission until respiration of the subject H becomes the stored phase even if a user instructs start of radiation emission, and start radiation emission at the timing when respiration of the subject H becomes the stored phase. If necessary, the phase at the end of radiation emission in the second dynamic imaging may also be stored, and in the third dynamic imaging and thereafter, the above-described control may be made. This can make the last frame image taken by one dynamic imaging match the first frame image taken by the next dynamic imaging in phase. By combining the taken dynamic images in order, one dynamic image is generated. Thus, even if the maximum radiation emission time is short and images of one cycle of respiration cannot be taken by one dynamic imaging as described above, a dynamic image which is substantially the same as that generated by continuously taking images of one cycle of respiration can be generated and analyzed without unnecessary exposure of a subject H to radiation.

Second Embodiment

Next, a second embodiment of the present invention is described.

The dynamic analysis system 100 of the second embodiment is, in configuration, the same as that of the first embodiment described with reference to FIG. 1 and FIG. 2 except that, in the second embodiment, the radiation generation apparatus 1 can emit radiation of different energy levels (tube voltages) and perform imaging by switching the energy levels in order at the beginning or end of dynamic imaging, whereby k frame images for an energy subtraction process can be obtained. The console 2 can set, through the operation unit 23, radiation emission conditions for obtaining k frame images for the energy subtraction process in addition to the radiation emission conditions for dynamic imaging. The radiation emission conditions for obtaining k frame images for the energy subtraction process include: j ($j \geq 2$) energy levels (tube voltages) to switch; the number of times k that imaging is performed with energy levels being switched; and switching order of energy levels. Because imaging is performed with energy levels being switched, preferably, the radiation generation apparatus 1 emits radiation by pulse emission from the radiation source 11.

The energy subtraction process is a process to extract or attenuate a structure(s) having a predetermined linear attenuation coefficient by performing mathematical operation on j frame images which are taken continuously in terms of time with j energy levels being switched. The number of times k that imaging is performed with j energy levels being switched for the energy subtraction process is equal to or more than the number of energy levels j.

For example, if frame images for the energy subtraction process are obtained at the beginning of dynamic imaging, and the number of energy levels is three (energy levels A, B, C), k=j may hold as described in the following Case (1) or k≠j may hold as described in the following Case (2).

Case (1) (k=j); A, B, C, C, C, . . . : in the first three times of imaging in dynamic imaging, radiation of three energy levels is emitted by the energy levels being switched, whereby frame images for the energy subtraction process are obtained; and subsequently, radiation of the energy level C is emitted for imaging multiple times, the energy level C being the same as the last energy level in obtaining the frame images for the energy subtraction process, whereby frame images for dynamic analysis are obtained by imaging with the energy level C.

Case (2) (k≠j); A, B, C, A, B, B, B . . . : in the first five times of imaging in dynamic imaging, radiation of three energy levels is emitted by the energy levels being switched, whereby frame images for the energy subtraction process are obtained; and subsequently, radiation of the energy level B is emitted for imaging multiple times, the energy level B being the same as the last energy level in obtaining the frame images for the energy subtraction process, whereby frame images for dynamic analysis are obtained by imaging with the energy level B.

That is, in the second embodiment, at Step S2 of the imaging control process shown in FIG. 3, the radiation emission conditions, which include the energy levels of radiation to switch, the number of times that imaging is performed with the energy levels being switched and the switching order of energy levels, for the energy subtraction process, are set in the radiation generation apparatus 1. Further, at Step S4, at the beginning or end of dynamic imaging, the radiation generation apparatus 1 switches the set j energy levels of radiation to perform imaging k times, whereby a dynamic image including k ($k \geq j$) frame images for the energy subtraction process is obtained.

The console 2 performs the dynamic analysis process on the dynamic image obtained by the imaging control process, as with the first embodiment. However, the product recognition process (Step S112) in the product attenuation process at Step S11 in the second embodiment is different from that in the first embodiment. Hereinafter, the product recognition process performed by the control unit 21 in the second embodiment is described.

First, the control unit 21 performs the product recognition process employing the energy subtraction process, using the first or last k frame images of the dynamic image obtained by dynamic imaging, thereby obtaining k−j+1 product-enhanced images (product-recognized images). The product recognition process employing the energy subtraction process is a process to obtain images in which a product(s) is recognized by: performing mathematical operation on, among the first or last k frame images of the dynamic image, j frame images continuous in terms of time taken with radiation of j different energy levels; and attenuating the image signal components of bones and soft tissue of the subject H captured in the dynamic image, for example.

In order to attenuate the image signal components of both bones and soft tissue of the subject H captured in the dynamic image, preferably, the number of energy levels j is three or more. If i types of products having different linear attenuation coefficients of energy characteristics are captured in the dynamic image, preferably, the number of energy levels j is i+2 or more, and mathematical operation with the following Formulae is performed on each j frame images continuous in terms of time taken with radiation of j different energy levels so as to attenuate the image signal components of bones and soft tissue of the subject H and product(s) having other linear attenuation coefficient(s) of energy characteristics, whereby i product-enhanced images in which only respective i products having respective linear attenuation coefficients of energy characteristics are enhanced are obtained.

In j frame images continuous in terms of time taken with radiation of j different energy levels, when p1 to pj respectively represent signal values of the same pixel, pixel values Pe1 to Pei respectively enhancing (extracting) i products respectively having linear attenuation coefficients e1 to ei of energy characteristics can be obtained by mathematical operation with the following Formulae, for example.

$$Pe1 = \alpha 11*P1 + \alpha 12*P2 + \alpha 13*P3 + \ldots + \alpha 1j Pj$$

$$Pe2 = \alpha 21*P1 + \alpha 22*P2 + \alpha 23*P3 + \ldots + \alpha 2j Pj$$

$$\ldots$$

$$Pei = \alpha i1*P1 + \alpha i2*P2 + \alpha i3*P3 + \ldots + \alpha ij Pj \quad \text{[Formulae]}$$

($\alpha 11$ to $\alpha ij$ represent real number coefficients.)

Preferably, the mathematical operation method for j frame images is changed (the coefficients $\alpha 11$ to $\alpha 1j$ are changed) according to the type of product; to be specific, according to i types of products having different linear attenuation coefficients of energy characteristics. Here, it is possible to display a GUI on the display unit 24 to input, from the operation unit 23, the type and/or material of product inserted into a patient, identify the linear attenuation coefficient of energy characteristics of the product according to the input type and/or material of product, and set coefficients $\alpha 11$ to $\alpha 1j$ based on the identified linear attenuation coefficient of energy characteristics of the product.

A product-enhanced image obtained by adding up, with respect to each pixel, values of the same pixel in i product-enhanced images obtained with the above Formulae is output as the result of the product recognition process. Alternatively, it is possible to: binarize each of i product-enhanced images, which are obtained with the above Formulae, with a predetermined threshold value; obtain a region showing one of the two values in each product-enhanced image as a product region image; composite the obtained i product region images, for example, by regarding a pixel(s) as a product region if at least one of the i product region images shows that the pixel(s) constitutes the product region (i.e., OR operation); and output the result of the composition as the result of the product recognition process. Performing the product recognition process by using j frame images continuous in terms of time taken with radiation of j energy levels while shifting the frame images can generate the results of the product recognition process of k−j+1 frame images continuous in terms of time. For example, in the above Case (2) where imaging is performed with j=3 energy levels A, B, C being switched to be A, B, C, A, B, B, B . . . , performing the product recognition process employing the energy subtraction process by using k=5 frame images taken with A, B, C, A, B on each three frame images continuous in terms of time taken with three different energy levels, namely, on each of groups ABC, BCA and CAB, can generate k−j+1=3 product-enhanced images.

In the case of "k−j+1>1", preferably, the results of the product recognition process of the first or last k−j+1 images are compared with one another so as to be corrected. Further, on the product-enhanced images obtained by the above process, the product recognition process at Step S112 in FIG. 5 described in the first embodiment or the like may be performed to recognize the product(s). This can improve accuracy of product recognition.

After obtains k−j+1 frame images in which the product is recognized by the product recognition process employing the energy subtraction process, the control unit 21 performs the product recognition process employing simple image processing on the remaining frame images on which no product recognition process is performed yet, based on the results of the product recognition process of the k−j+1 frame images.

The simple product recognition process is a process to recognize a product region(s), for example, by: referring to the product region recognized in the frame image immediately before a frame image concerned; and searching only several pixels in the surroundings of the border part of the product region in the frame image concerned for the spatial edge (gradient) of the product so as to extract the edge of the product therein. This can reduce the computation and enables high-speed processing as compared with the case where the complete product recognition process is performed on all of the frame images. A method for extracting the spatial edge of a product with high accuracy is exemplified by a dynamical contour extraction method. This is a method of: taking coordinates of a product region extracted in a frame image immediately before a frame image concerned as the initial position; and performing contour extraction multiple times with (i) the shape of the product and (ii) the edge characteristics on the frame image, as evaluation functions. This can catch the contour of a product with high accuracy. This dynamical contour extraction method can flexibly deal with change in shape/position of a product which is a target and hence can be used for frame images between which change is large.

For further simplification, for example, if the taken image is a dynamic image of the chest in the breathing state, a product(s) usually moves at inhalation and exhalation in a particular direction according to the type of the product. Hence, it may be determined whether each frame image has been taken during inhalation or exhalation, and search for the edge of a product may be performed in a particular direction according to the type of the product; for example, when it is determined that a frame image has been taken during inhalation, search for the edge of a product is performed only in the down direction in relation to the product region extracted in its immediately-before frame image, whereas when it is determined that a frame image has been taken during exhalation, search for the edge of a product is performed only in the up direction in relation to the product region extracted in its immediately-before frame image. If multiple types of products are captured as described above, the direction to search for the edge may be changed according to the type of product and the timing (i.e., during inhalation or exhalation), whereby products are extracted type by type.

Whether a frame image has been taken during inhalation or exhalation can be determined by detection of a moving direction of the diaphragm or density change (increase/decrease) in the lung field region in relation to its immediately-before frame image. In the case of the moving direction of the diaphragm, if the diaphragm moves in the down direction, it is during inhalation, whereas if the diaphragm moves in the up direction, it is during exhalation. In the case of the density change in the lung field region field, if the density increases, it is during inhalation, whereas if the density decreases, it is during exhalation. Because the diaphragm has a large density gradient, detection of the edge of the diaphragm makes it easy to determine whether a frame image concerned has been taken during inhalation or exhalation. Although the lung field region can be recognized as with Step S111 by detection of the edge of the chest, even without recognition of the lung field region, whether a frame image has been taken during inhalation or exhalation can be determined by detection of, for example, the density increase/decrease in a predetermined region at the center of the frame image.

Thus, successively processing frame images by referring to the results of the product recognition process of their respective immediately-before frame images can simplify the product recognition process performed on the frame images and increase the processing speed of the product recognition process performed thereon.

While j frame images used for one energy subtraction process are taken, body movement, respiration and/or pulsation of the subject H occur, and accordingly the shadow of a structure captured in the respective frame images shifts in position. Therefore, it is preferable to perform a positioning process to correct the shift in position. Further, in each frame image of a dynamic image taken with radiation of low energy, the amount of noise is large in a region corresponding to a structure in a subject H, the structure having a low X-ray transmittance. Hence, it is preferable to perform a noise reduction process to make noise unnoticeable. However, the positioning process and the noise reduction process each take much processing time. In addition, the switching time interval to switch energy levels of radiation between frames has a limit, and accordingly the frame rate has a limit (upper limit).

Hence, the number of frame images used for the energy subtraction process is limited to k. This can increase the processing speed of the product recognition process performed on the entire dynamic image, can shorten a period of time for taking k frame images, performing the product attenuation process on the entire dynamic image and then displaying or inputting in the dynamic analysis process the dynamic image after the product attenuation process, and also, by taking only the first or last k frame images of the dynamic image at a frame rate lower than a preferable frame rate so as to switch energy levels of radiation, can take the remaining frame images at the preferable frame rate. If the processing time and the frame rate are sufficient, the product recognition process employing the energy subtraction process may be performed on all of the frame images of the dynamic image.

The processes at Step S113 and thereafter are the same as those in the first embodiment and therefore explanation thereof is omitted here.

As described above, according to the second embodiment, the complete product recognition process is performed on only some frame images and the simple product recognition process is performed on the remaining frame images. This can reduce the computation and enables high-speed processing.

In the second embodiment, the product recognition process employing the energy subtraction process is performed on some of a series of frame images, and the simple product recognition process is performed on the remaining frame images. The simple product recognition process is a process to recognize a product region(s) by: referring to the product region already recognized by the product recognition process; and searching only several pixels in the surroundings of the border part of the product region for the spatial edge (gradient) of the product so as to extract the edge of the product. However, instead of the product recognition process employing the energy subtraction process, another product recognition process, such as the product recognition process described in the first embodiment, may be performed.

An image in which only soft tissue is extracted by the energy subtraction process may be used as an input image for dynamic analysis at Step S13 in FIG. 4. In the image in which only soft tissue is extracted by the energy subtraction process, the image signal components of products are attenuated, and hence dynamic analysis can be performed with high accuracy. Although it depends on the type of product, difference between a product and soft tissue in liner attenuation coefficients of energy characteristics may be not large. In such a case, in the image in which only soft tissue is extracted by the energy subtraction process, the image signal component of the product may be insufficiently attenuated and remain. In such a case, in the complete product recognition process performed on only some frame images, first, as described above, product-enhanced images of respective products, which are targets of attenuation, are obtained by the energy subtraction process, and next, on the product-enhanced images of the respective products, the product recognition process at Step S112 in FIG. 5 described in the first embodiment is performed to generate edge-enhanced images, detect straight lines and curves, and so forth, thereby recognizing product regions of the respective products. Based on the product regions of the respective products recognized by the complete product recognition process, the simple product recognition process is performed on the other frame images product by product, thereby recognizing the product regions of the respective products in the respective frame images. Then, for the respective (original) frame images, the density profiles of the product regions of the respective products are created and the image signal components of the product regions of the respective products are attenuated, as with Steps S113 and S114 in FIG. 5 described in the first embodiment, whereby an image(s) in which the image signal components of all the target products are attenuated are obtained. Thus, an image(s) in which the image signal components of target products are attenuated with high accuracy can be generated, and the diagnostic accuracy based on analysis results of dynamic images can be improved.

Third Embodiment

Next, a third embodiment of the present invention is described.

The dynamic analysis system 100 of the third embodiment is, in configuration, the same as that of the first embodiment described with reference to FIG. 1 and FIG. 2 except that, in the third embodiment, the radiation generation apparatus 1 further has a tomosynthesis imaging function.

That is, the radiation generation apparatus 1 has a moving mechanism to move the radiation source 11 in a body axis direction of a subject H, and, in tomosynthesis imaging, the radiation generation apparatus 1 emits radiation a predetermined number of times to the FPD cassette 4 from the radiation source 11 while moving the radiation source 11, and the FPD cassette 4 performs an image obtaining process a predetermined number of times and sends the obtained images to the console 2. In order to prevent blurring caused by movements of the radiation source 11 and a subject H (motion artifacts), preferably, the radiation generation apparatus 1 emits radiation by pulse emission from the radiation source 11. However, the radiation generation apparatus 1 may be configured to continuously emit radiation without a break (continuous emission) from the radiation source 11, and the FPD cassette 4 may be configured to perform the image obtaining process a predetermined number of times during the period of time.

The console 2 can set radiation emission conditions for tomosynthesis imaging in addition to the radiation emission conditions for dynamic imaging. Dynamic chest imaging is performed in the breathing state, whereas tomosynthesis chest imaging is performed in the breath holding state by imaging a chest multiple times while changing the imaging angle. Hence, before or after dynamic imaging, an operator operates the operation unit 23 to set the conditions for tomosynthesis imaging in the console 2, and the imaging is performed.

A set of projection images obtained by tomosynthesis imaging is subjected to a reconstruction process performed in the console 2 by the control unit 21 in cooperation with a program stored in the storage unit 22 so as to generate images of multiple sections (slice surfaces) (tomographic images). These tomographic images are utilized at Step S112 for the product recognition process so as to recognize a product region(s) in the respective frame images obtained by dynamic imaging. The tomographic images obtained by tomosynthesis imaging are sectional images of surfaces (slices) of a subject H at a plurality of points in a radiation emission direction (z direction), the surfaces being perpendicular to the z direction.

In the product recognition process using tomographic images obtained by tomosynthesis imaging, first, except the tomographic images of the slice surfaces of the regions located at the body surface, which includes regions of frontal ribs, posterior ribs, collarbone and vertebrae, pixel values of corresponding pixels of all the (remaining) tomographic images are added up (integrated) so as to obtain a chest image with bones removed. This chest image without bones corresponds to, among a series of frame images obtained by dynamic imaging before or after tomosynthesis imaging, a frame image having a breath phase the same as the breath phase of the breath holding state in which tomosynthesis imaging is performed. On this chest image without bones, the product recognition process described in the first embodiment is performed. That is, the edge enhancement by the frequency enhancement process for a product(s), the edge detection and the straight line/curve detection are performed to recognize the product region(s). Because ribs have been removed from the chest image generated from the tomographic images, accuracy of product recognition is high as compared with the first embodiment.

Next, on the respective frame images obtained by dynamic imaging, the simple product recognition process described in the second embodiment is performed based on the above-described chest image generated based on the tomographic images, thereby recognizing the product region in the respective frame images. The size of the lung field region in the chest image obtained from the tomographic images is the same as that in one (or more) of the frame images of the dynamic image. Hence, first, a frame image having the same lung field size as the chest image obtained from the tomographic images is selected, and the simple product recognition process is performed on the selected frame image based on the product region recognized in the chest image, and then the simple product recognition process is performed on the other frame images in order staring from its adjacent frame image, whereby the product recognition process is performed on the respective frame images. This can reduce the computation and enables high-speed processing.

The processes at Step S113 and thereafter are the same as those in the first embodiment and therefore explanation thereof is omitted here.

According to the third embodiment, the product recognition process is performed based on the image without bones, and the image signal component of the product in the recognized product region is attenuated. This can attenuate products with high accuracy. Further, the complete product recognition process is performed on only one image, namely, the chest image, and the simple product recognition process is performed on the frame images. This can reduce the computation and enables high-speed processing. In this embodiment, both dynamic imaging and tomosynthesis imaging are performed on the same examination target site of the same subject H. Hence, it is preferable that (i) the dynamic image before analysis, (ii) the image of the analysis result of the dynamic image and (iii) the tomographic images obtained by performing the reconstruction process on the images obtained by tomosynthesis imaging are displayed by being arranged next to one another (arranging display), or two types of these images are displayed at the same position on the display unit 24 switchably at proper timing (switchable display) or displayed on the display unit 24 by being superimposed with different transmittances (superimposing display). This kind of display allows a user to make diagnosis by looking at the shape information and the function information based on movement at the same time and comparing them with one another. Therefore, the user can accurately understand the state of the diseased site, and hence the diagnostic accuracy can be improved. In the arranging display or switchable display, for example, the inter-frame difference images or the like as the analysis result may be displayed as a video, and also the tomographic images obtained by tomosynthesis imaging may be displayed in the form of video. In the superimposing display, for example, the tomographic images obtained by tomosynthesis imaging may be superimposed on one image most clearly reflecting the local motion extracted from the inter-frame difference images or the like as the analysis result so as to be displayed in the form of video; on the contrary, the inter-frame difference images or the like as the analysis result may be superimposed on one image showing the shape characteristics most extracted from the tomographic images obtained by tomosynthesis imaging so as to be displayed as a video. This makes it easy for a user to compare the shape information and the function information at the same position in the same examination target site with one another. Therefore, the user can accurately understand the state of the diseased site. Further, the result of a CAD process used for cancer diagnosis support or the like performed on the tomographic images obtained by tomosynthesis imaging and the analysis result of the dynamic image, such as the image(s) in which the inter-frame difference values are shown in color, may be displayed by being arranged next to one another, displayed at the same position on the display unit 24 switchably at proper timing or displayed on the display unit 24 by being superimposed with different transmittances.

For both dynamic imaging and tomosynthesis imaging, preferably, alignment is made such that the radiation emission direction at the center point of radiation radially emitted from the radiation source 11 matches the normal line of the FPD cassette 4 extended from the center point of the imaging region of the FPD cassette 4. However, in the visiting system (100), the FPD cassette 4 and the radiation generation apparatus 1 are separate. Hence, it is difficult for a user to accurately make such alignment and the accurate alignment requires time. Then, at least three three-dimensional magnetic sensors are provided, for example, each of inside the FPD cassette 4 and near the radiation exit of the radiation source 11 so that the visiting system can detect the position of the FPD cassette 4, the angle thereof to the horizontal surface, the position of the radiation exit of the radiation source 11, and the radiation emission direction; and with a not-shown drive mechanism provided in the radiation generation apparatus 1, move/change the position and direction of the radiation generation apparatus 1, to be specific, the position and direction of the radiation source 11, such that the radiation emission direction at the center point of radiation radially emitted from the radiation source 11 matches the normal line of the FPD cassette 4 extended from the center point of the imaging region of the FPD cassette 4. Further, the radiation generation apparatus 1 may be provided with a not-shown aperture stop part to reduce the irradiated field of radiation at the radiation exit of the radiation source 11 and further provided with a drive mechanism to change the irradiated field of radiation, whereby the irradiated field of radiation is changed to approximately match the imaging region of the FPD cassette 4. Further, the detected position of the FPD cassette 4, angle thereof to the horizontal surface, position of the radiation exit of the radiation source 11 and radiation emission direction may be displayed on the display unit 24 of the console 2 so that a user can recognize in what direction and how much the position and direction of the radiation generation apparatus 1, to be specific, the position and direction of the radiation source 11, should be moved/changed. Further, it may be determined whether the radiation emission direction at the center point of radiation radially emitted from the radiation source 11 approximately matches the normal line of the FPD cassette 4 extended from the center point of the imaging region of the FPD cassette 4, and the determination result may be displayed on the display unit 24 of console 2.

This can shorten time necessary for a user to accurately align the FPD cassette 4 with the radiation source 11, and this accurate alignment can reduce (i) unnecessary exposure of a subject H to radiation and (ii) decrease in image data quality.

For tomosynthesis imaging of a subject H who is at a reclining position, in general, the radiation generation apparatus 1 requires a complex drive mechanism to move the radiation source 11 to be accurately aligned with the FPD cassette 4 if the FPD cassette 4 is not horizontally placed. In order to simplify the drive mechanism of the radiation generation apparatus 1 used for the radiation source 11 at the time of tomosynthesis imaging, how much the FPD cassette 4 inclines with respect to the horizontal surface may be detected with the above-described three-dimensional magnetic sensors or the like, whether the FPD cassette 4 is approximately horizontally placed may be determined, and the determination result may be displayed on the display unit 24 of the console 2. The angle indicating how much the FPD cassette 4 inclines with respect to the horizontal surface is also an indicator of the posture of the subject H. Hence, parameters or the like for dynamic analysis and for the reconstruction process performed on the images obtained by tomosynthesis imaging may be changed according to the detected angle.

Figure 7A:
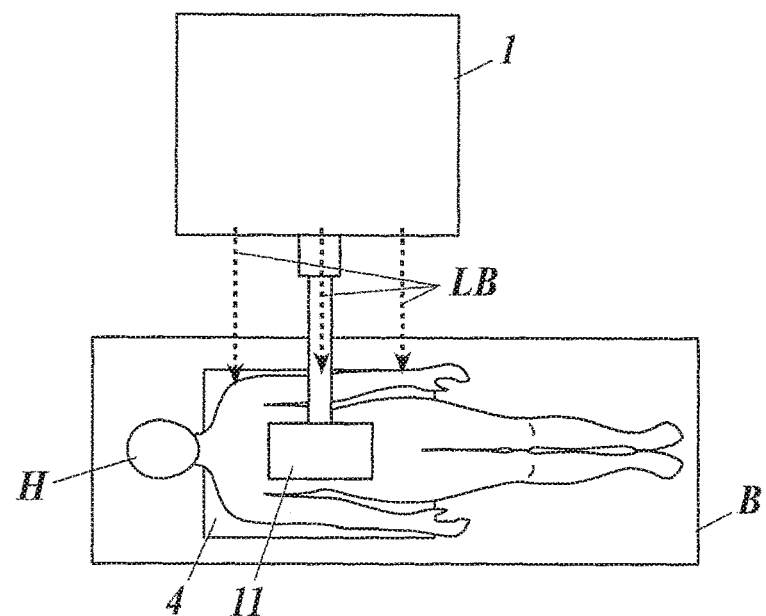
FIG. 7A shows a state, viewed from the top, in which a radiation generation apparatus emits laser beams to, of a subject, a point corresponding to an isocenter and a range within which tomographic images are generated by a reconstruction process.

In tomosynthesis imaging, an image of a section near an isocenter C, namely, the rotation center of the radiation source 11 moving in tomosynthesis imaging (shown in FIG. 7B), in the z direction has the minimum amount of artifacts. Hence, in order that a user can position the most interesting part of the examination target site of a subject H at the isocenter C at the time of tomosynthesis imaging, preferably, as shown in FIG. 7A, the radiation generation apparatus 1 emits, in advance, LED laser beams LB or the like to a subject H so as to project light or the like so that a user can recognize the position of the isocenter C in advance as shown with CP in FIG. 7C. This allows a user to easily position the most interesting part of the examination target site of a subject H near the isocenter C at the time of tomosynthesis imaging.

If the range, within which tomographic images are generated by performing the reconstruction process on the images obtained by tomosynthesis imaging, is different from the range desired by a user, an image of a desired section (a desired tomographic image) cannot be obtained; or an image of an excessive section is generated, and accordingly the reconstruction process unnecessarily takes much processing time, and also the data amount increases and the storage capacity is unnecessarily consumed. Then, in order that a user can perform, at the time of tomosynthesis imaging, the above-described positioning or change the parameters for the reconstruction process such that the range, within which tomographic images are generated by the reconstruction process, matches the range desired by the user, preferably, as shown in FIG. 7A, the radiation generation apparatus 1 emits, in advance, LED laser beams LB or the like to the range, within which tomographic images are generated by the reconstruction process, of a subject H so as to project light or the like so that a user can recognize the range in advance as shown with R in FIG. 7C. This allows a user to perform the positioning or change the parameters for the reconstruction process such that only tomographic images within the interesting range of the examination target site of a subject H are generated at the time of tomosynthesis imaging, and accordingly can increase examination efficiency.

Figure 7B:
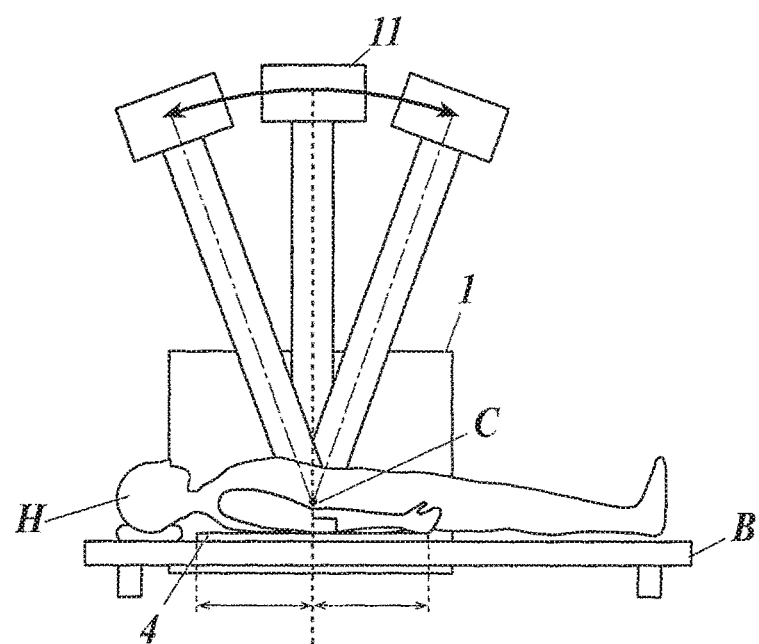
FIG. 7B shows the state in FIG. 7A from a side opposite to a side where the radiation generation apparatus is disposed.
Figure 7C:
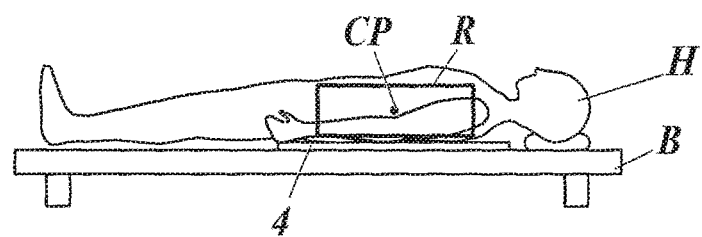
FIG. 7C shows the subject in the state in FIG. 7A from the side where the radiation generation apparatus is disposed.
Figure 8:
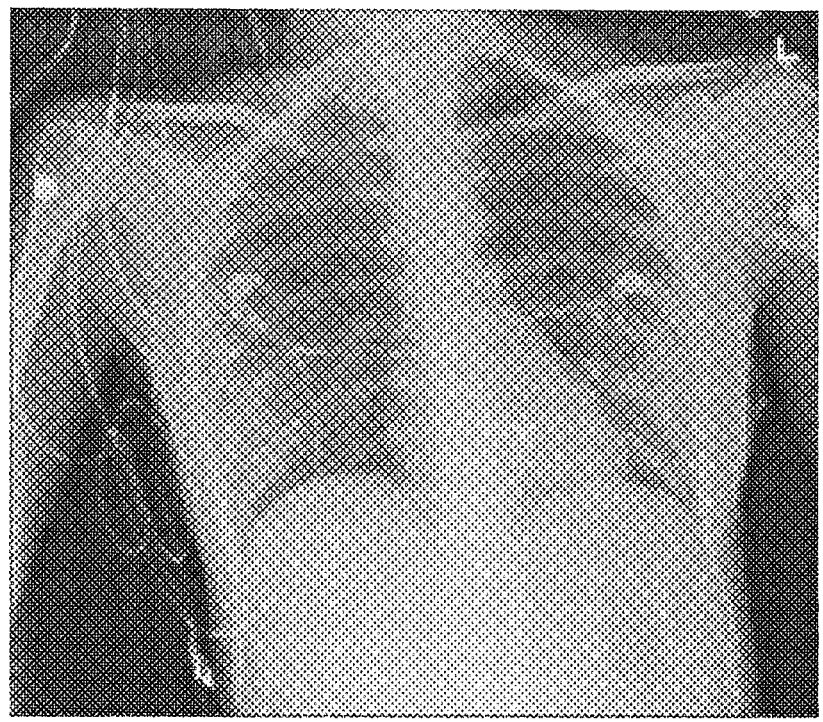
FIG. 8 shows an example of an image of a chest to which products are attached.

FIG. 7A shows a state, viewed from the top, in which the radiation generation apparatus 1 emits the laser beams LB to, of a subject H, a point corresponding to the isocenter C and the range R within which tomographic images are generated by the reconstruction process. FIG. 7B shows the state in FIG. 7A from a side opposite to a side where the radiation generation apparatus 1 is disposed, wherein the positional relationship of the subject H, the radiation generation apparatus 1 and the FPD cassette 4 is shown. FIG. 7C shows the subject H in the state in FIG. 7A from the side where the radiation generation apparatus 1 is disposed.

Preferably, near the radiation exit of the radiation source 11, there is provided a sensor which measures distance from the radiation exit to the surface of a subject H in a noncontact manner, such as an ultrasonic distance sensor or an infrared sensor which is constituted of infrared-ray emitting elements and light receiving elements, and detects the reflected light of light output from the emitting elements with the receiving elements and converts the detected light into a distance by evaluation and mathematical operation on the light, and the console 2 has a function of estimating a dose rate or an incident dose on the surface of the subject H based on the distance from the radiation exit to the surface of the subject H (FSD: Focal spot to Skin Distance) measured by the sensor and the radiation emission conditions to be sent to the radiation emission control unit 12. Attaching this dose rate or incident dose to the taken image data and storing them together enables dose management about how much the subject H is exposed. Preferably, the console 2 performs control to prohibit the radiation generation apparatus 1 from emitting radiation if the calculated estimated value of the dose rate or incident dose on the surface of a subject H is equal to or more than a predetermined threshold value. This can prevent radiation of a predetermined dose rate or incident dose or more from being emitted to a subject H, caused by, for example, the subject H and the radiation exit being too close to each other.

Preferably, the console 2 further has a function of: measuring distance from the radiation exit to the FPD cassette 4 (SID: Source to Image Distance) based on the position of the FPD cassette 4 and the position of the radiation exit of the radiation source 11 detected by the three-dimensional magnetic sensors or the like provided near the radiation exit of the radiation source 11 and in the FPD cassette 4; detecting the size of the irradiated field from the not-shown aperture stop part to reduce the irradiated field of radiation provided at the radiation exit of the radiation source 11; and estimating an incident surface dose with a formula of the NDD (numerical dose determination) method or the like based on (i) the FSD and (ii) the radiation emission conditions to be sent to the radiation emission control unit 12, which are described above, (ii) the measured SID and (iv) the detected size of the irradiated field. Further, the console 2 may calculate body thickness information on a subject H by subtracting FSD from SID, which are measured as described above, and, based on the calculated body thickness information, calculate the radiation emission conditions to be sent to the radiation emission control unit 12. This enables radiation emission under the radiation emission conditions suitable for the body thickness of a subject H and accordingly can reduce decrease in image quality due to an insufficient dose and unnecessary increase in exposure of the subject H to radiation due to an excessive dose.

Preferably, the console 2 attaches the SID and FSD measured by the sensors or the like and the radiation emission conditions to the taken image data and store them together; and if a subject H has been imaged previously by this visiting system and the previously taken image data is stored in the console 2, reads the SID, FSD and radiation emission conditions attached to the previously taken image data and sends the read radiation emission conditions to the radiation emission control unit 12, and also moves/changes the position and direction of the radiation generation apparatus 1, to be specific, the position and direction of the radiation source 11, with the not-shown drive mechanism provided in the radiation generation apparatus 1 in such a way as to agree with the read SID and FSD. This allows a user to accurately reproduce the alignment and the radiation emission conditions used in the previous imaging and accordingly easily compare the recently taken image with the previously taken image(s), whereby a dynamic image more easily comparable with the previously taken image(s) can be obtained.

Fourth Embodiment

In the first to third embodiments, in order to improve the diagnostic accuracy based on dynamic images, in a dynamic image, the image signal components of products, which are obstructive to dynamic diagnosis, are attenuated, and the dynamic image with the attenuated image signal components of the products is displayed for dynamic analysis. Meanwhile, there is a demand for checking whether products are properly inserted. It is difficult to perform the check by displaying a dynamic image as it is without the product attenuation process because products such as a lead of a heart pacemaker and a catheter show low contrast on an X-ray image. Hence, in a fourth embodiment of the present invention, when the dynamic image is displayed as with the first to third embodiments, a product-enhanced image is generated and displayed together.

The dynamic analysis system 100 of the fourth embodiment is, in configuration, the same as that of each of the first to third embodiments except that, in the fourth embodiment, the dynamic analysis system 100 can further perform still image shooting (simple roentgenography).

The console 2 can set radiation emission conditions for still image shooting in addition to the radiation emission conditions for dynamic imaging. Before or after dynamic imaging, an operator operates the operation unit 23 to set the conditions for still image shooting in the console 2, and the imaging is performed.

A chest plain radiograph obtained by still image shooting is subjected to a product enhancement process performed in the console 2 by the control unit 21 in cooperation with a program stored in the storage unit 22 so as to generate a product-enhanced image. As a method for the product enhancement process, a well-known image processing technology can be used. For example, a chest plain radiograph is subjected to smoothing with a median filter and sharpening by unshape masking, and the obtained image is subjected to banalization by thresholding using the moving average method ("Improved Visualization of Cardiac Pacemaker Lead on Chest Radiographs", Radiological Physics and Technology, Vol. 63, No. 4, pp. 420-427) or the like.

The product-enhanced image is, by the control unit 21, correlated and stored in the storage unit 22 with a dynamic image which is taken together with the chest plain radiograph, and displayed on the display unit 24. For example, the product-enhanced image may be displayed, at Step S12 in the first to third embodiments, together with the dynamic image after (or before and after) the product attenuation process. Alternatively, an operation button for displaying a product-enhanced image or the like may be displayed on the display unit 24, and the product-enhanced image may be displayed in response to an operation on the operation button through the operation unit 23.

Thus, in the fourth embodiment, a dynamic image with attenuated products is displayed. This allows a user to observe the ventilation state during or after a surgery without being affected by products. Further, in the fourth embodiment, a dynamic image is displayed together with a product-enhanced image. This allows a user to easily check whether products are properly inserted.

Further, pulse emission for dynamic imaging may cause malfunctions of a pacemaker, an implantable cardiac defibrillator or the like (hereinafter "a pacemaker(s) or the like"). Hence, continuous emission needs to be used to image patients who use pacemakers or the like. If patient information shows YES in "pacemaker or the like", or a pacemaker or the like is recognized in the lung field region by still image shooting (scout shooting) performed immediately before dynamic imaging or by analysis of one to several frame images taken immediately after dynamic imaging starts by pulse emission, it is preferable to display on the console 2 a message to prohibit or stop dynamic imaging by pulse emission. This can avoid malfunctions of a pacemaker or the like at the time of imaging a patient who uses a pacemaker or the like. When a pacemaker or the like is recognized by analysis of one to several frame images taken immediately after dynamic imaging starts by pulse emission, the console 2 may send a signal to stop radiation emission to the radiation generation apparatus 1, thereby stopping radiation emission, or may send a signal to change to continuous emission to the radiation generation apparatus 1, thereby changing to continuous emission which automatically makes the exposure dose uniform.

If the radiation generation apparatus 1 can perform both pulse emission and continuous emission, it is preferable that pulse emission, which causes little blurring in frame images, is automatically selected when motion of the target site of a subject H is relatively slow, dynamic imaging is performed at a low frame rate and the taken dynamic image is analyzed. This can prevent, in frame images, blurring caused by movements and enables shaper depiction of a fine target even when the frame rate is low. On the other hand, if motion of the target site of a subject H is relatively fast and dynamic imaging is performed at a high frame rate, the FPD cassette 4 may be configured to repeat only reading without having the accumulation time, and the radiation generation apparatus 1 may be configured to perform continuous emission as the radiation emission method. Elimination of the accumulation time of the FPD cassette 4 realizes a high frame rate as compared with pulse emission for which the accumulation time is ensured.

As described in the first to fourth embodiments, according to the dynamic analysis system 100, the control unit 21 of the console 2 performs the attenuation process to attenuate an image signal component(s) of a product(s) in a plurality of frame images showing a dynamic state of a subject H generated by the radiation generation apparatus 1 and the FPD cassette 4 working together, and analyzes the dynamic state of the subject H based on the frame images after the attenuation process.

Consequently, there is no difficulty in determining whether difference between analysis results of dynamic images shows change in the state of a patient or shows presence/absence of a product(s). Accordingly, the diagnostic accuracy based on analysis results of dynamic images can be improved.

The contents described in the above embodiments are preferred examples of the dynamic analysis system of the present invention, and hence the present invention is not limited thereto.

For example, in the above embodiments, the dynamic analysis system is a visiting system (i.e., a system for going the rounds). However, the preset invention is also applicable to a dynamic analysis system which performs dynamic imaging at a radiation room and analyzes the obtained dynamic image(s).

Further, in the above embodiments, the console 2 sets the radiation emission conditions for still image shooting and dynamic imaging. However, it is possible that the radiation emission control unit 12 of the radiation generation apparatus 1 sets the radiation emission conditions for still image shooting and dynamic imaging in advance, the exposure switch 13 is provided with separate switches for still image shooting and dynamic imaging, and when the switch for still image shooting is pressed, exposure (radiation emission) is performed under the radiation emission conditions for still image shooting, whereas when the switch for dynamic imaging is pressed, exposure is performed under the radiation emission conditions for dynamic imaging. This configuration enables quick switching between still image shooting and dynamic imaging and also can reduce occurrence of wrong exposure caused by setting the radiation emission conditions for still image shooting instead of the radiation emission conditions for dynamic imaging by mistake, or vice versa.

Further, in the above embodiments, the radiation emission conditions are read from the storage unit 22 and set in the radiation emission control unit 12 through the communication unit 25. However, it is possible that the radiation generation apparatus 1 has not-shown storage unit, display unit and operation unit, and the radiation emission conditions stored in the storage unit of the radiation generation apparatus 1 are displayed on the display unit of the radiation generation apparatus 1 and selected/corrected through the operation unit of the radiation generation apparatus 1 and then set in the radiation emission control unit 12. In this case, the set radiation emission conditions may be sent from the radiation generation apparatus 1 to the console 2 through the communication unit 25.

Alternatively, it is possible that, without sending/receiving of the set radiation emission conditions through the communication unit 25, the FPD cassette 4 detects radiation emitted from the radiation generation apparatus 1 and determines, based on the dose rate or pixel value(s) of a frame image(s) immediately after start of radiation emission (i.e., irradiation), whether the detected radiation is for still image shooting or dynamic imaging, and, according to the determined information, namely, still image shooting or dynamic imaging, automatically changes the image reading conditions, such as a frame rate, the number of frame images taken by each imaging, an image size (matrix size), sensitivity (gain), a binning number and radiation-emission waiting time, immediately after start of radiation emission, and obtains frame images under the changed image reading conditions. In this case, when determines that the detected radiation is for still image shooting, the FPD cassette 4 sets or changes the image reading conditions to be a small gain, no binning and a radiation-emission waiting time of 0.5 to several seconds to perform reading only one time, whereas when determines that the detected radiation is for dynamic imaging, the FPD cassette 4 sets or changes the image reading conditions to be a large gain, binning of several to several ten pixels and a radiation-emission waiting time of 0 to 50 milliseconds to repeatedly perform radiation-emission waiting and reading by returning to the radiation-emission waiting time after reading each frame image. If the determined information by the FPD cassette 4, namely, still image shooting or dynamic imaging, mismatches the current image reading conditions, the FPD cassette 4 may notify the console 2 about the situation, and the console 2 may display thereon, immediately after start of radiation emission, a message to stop imaging because the radiation emission conditions mismatch the image reading conditions.

Usually, still image shooting and dynamic imaging are different in dose rate, and the dose rate for dynamic imaging is much smaller than that for still image shooting. Hence, the FPD cassette 4 can identify, immediately after start of radiation emission, still image shooting or dynamic imaging based on the dose rate of emitted radiation or the pixel value(s) of a frame image(s). Further, the FPD cassette 4 can identify, immediately after start of radiation emission, still image shooting or dynamic imaging by detecting rising characteristics of the dose rate (changing speed of the dose rate) of emitted radiation too. As a detection unit for the dose rate, for example, an exposure sensor which outputs the output value in proportion to the dose of the emitted radiation is provided on the back surface of a glass substrate in the FPD cassette 4, and the FPD cassette 4 reads the output value of the sensor at predetermined time intervals of, for example, several to several hundred microseconds. Then, the FPD cassette 4 calculates the dose rate from the change amount of the output value of the sensor read at the predetermined time intervals. The FPD cassette 4 can also calculate the changing speed of the dose rate from the dose rate calculated at predetermined time intervals. The FPD cassette 4 first detects that the obtained output value of the sensor exceeds a predetermined threshold value, thereby detecting that a predetermined radiation dose is emitted, and then identifies still image shooting or dynamic imaging by determining whether or not the calculated dose rate or changing speed of the dose rate is equal to or more than a predetermined threshold value, for example.

The FPD cassette 4 may identify still image shooting or dynamic imaging and further identify dynamic imaging by pulse emission or dynamic imaging by continues emission based on (i) the value of the dose rate and (ii) a period of time that the dose rate keeps being a predetermined threshold value or more or (iii) a period of time that the dose rate becomes almost 0 from the predetermined threshold value, and set the image reading conditions according to the identification result(s). For example, the FPD cassette 4 determines that it is dynamic imaging by continuous emission if the dose rate is less than a predetermined threshold value; determines that it still image shooting if (i) the dose rate is equal to or more than the predetermined threshold value, (ii) the period of time that the dose rate keeps being the predetermined threshold value or more is equal to or more than a predetermined period of time, or (iii) the product of the dose rate multiplied by the period of time that the dose rate keeps being the predetermined threshold value or more is equal to or more than the predetermined threshold value is equal to or more than a predetermined threshold value; and determines that it is dynamic imaging by pulse emission if none of the above is satisfied. Preferably, the threshold values used here are changed according to the patient information such as the build, age and sex. For example, if a patient is thin or a child, and the dose rate emitted (output) from the radiation generation apparatus 1 does not change, the threshold value is set at a large value. The FPD cassette 4 may detect timing at which the dose rate becomes almost 0 from the predetermined threshold value and thereby detect timing of the end of still image shooting or dynamic imaging by pulse emission. The FPD cassette 4 may identify still image shooting or dynamic imaging by detecting the pixel value(s) of a frame image(s). In this case, the FPD cassette 4, for example, keeps obtaining frame images at a predetermined frame rate since before radiation emission, and detects that the representative value of pixel values of all of or some of the obtained frame images exceeds a predetermined threshold value, thereby detecting that a predetermined radiation dose is emitted, and estimates the dose rate from the representative value. Thus, the FPD cassette 4 identifies still image shooting or dynamic imaging.

Here, the FPD cassette 4 identifies still image shooting or dynamic imaging. However, it is possible that immediately after start of radiation emission, the FPD cassette 4 sends the dose rate, the changing speed of the dose rate, the frame images or the representative value of the pixel values of the frame images to the console 2 through the communication unit 25, and the console 2 identifies still image shooting or dynamic imaging, and sends the image reading conditions according to the identified information, namely, still image shooting or dynamic imaging, to the FPD cassette 4 through the communication unit 25 so as to set the image reading conditions therein. This configuration makes it possible that, without sending/receiving of the radiation emission conditions between the radiation generation apparatus 1 and the console 2 or the FPD cassette 4, the console 2 or the FPD cassette 4 identifies, immediately after start of radiation emission, still image shooting or dynamic imaging based on the radiation emitted by the radiation generation apparatus 1, and sets the image reading conditions suitable for the FPD cassette 4 to obtain frame images. Therefore, even if the radiation generation apparatus 1 and the console 2 or the FPD cassette 4 cannot communicate with one another because their makers are different or so, the FPD cassette 4 can quickly switch between still image shooting and dynamic imaging without trouble, only by the radiation generation apparatus 1 changing the radiation emission conditions. Further, a message to stop imaging because the radiation emission conditions mismatch the image reading conditions may be displayed on the console 2, which can protect patients from being unnecessarily exposed.

Further, the access point 3 may have a function of communicating/connecting to a 3G line, a 4G line, a satellite communication line or the like and connecting to a mobile phone network, Internet or the like via the above wireless communication line and transferring the image data, analysis results calculated based on image data, patient information on subjects H and so forth which are stored in the storage unit 22 of the console 2 and encoded and/or compressed, directly from the visiting system to a server on a cloud or a server or terminal such as a PACS in a remotely located hospital. The console 2 can receive, through the operation unit 23 or the communication unit 25, vital information on subjects H such as the respiratory rate, heart rate and blood pressure and/or measurement results of other examinations on the subjects H such as the oxygen saturation, respiratory flow and electrocardiograms, and the access point 3 may also have a function of transferring these vital information and/or measurement results of other examinations which are input into the console 2 and attached to the image data. Thus, the visiting system is configured to send the image data, to which the patient information, vital information, measurement results of other examinations and/or analysis results are attached, directly to a remotely located facility such as a hospital so as to be viewed there. Hence, when this visiting system is used at the scene of accidents, disasters, emergencies or the like, and takes images, calculates analysis results based on the taken image data, and obtains and receives vital information and/or measurement results of other examinations, even if no doctor who can make diagnosis based on these data and information is at the scene, a doctor who is far away from the scene can make remote diagnostics immediately by viewing these data and information, and treatments or the like can be speedily performed on the subjects H at the scene based on the diagnosis results made by the right doctor. At the time, if speediness has priority, preferably, the compression method is changed depending on the communication capacity per unit time of the wireless communication line. For example, if the communication capacity is small, the compression rate is increased to reduce the data amount, irreversible compression is employed, or the like.

Further, in the above embodiments, the access point 3 is movably installed in the visiting system. However, there may be a plurality of access points 3, and in this case, some or all of the access points 3 may be immovably installed in a hospital or the like.

Further, in the above embodiments, the communication unit 25 includes a wireless LAN adopter or the like and controls data sending/receiving to/from external apparatuses such as the radiation generation apparatus 1 and the FPD cassette 4 connected to a communication network such as a wireless LAN via the access point 3. However, the console 2 may be configured such that the communication unit 25 directly sends/receives data to/from some or all of the external apparatuses using an ad hoc mode of a wireless LAN, Bluetooth® or the like, not via the access point 3. This configuration omits some or all of the access points 3 and accordingly can reduce the weight of the system and also reduce the costs.

Further, for the FPD cassette 4 to send obtained frame images to the console 2 through the communication unit 25 via a wireless or cable network, depending on the communication capacity per unit time, each time the FPD cassette 4 obtains a frame image during dynamic imaging, the FPD cassette 4 may temporarily store the frame image in the storage unit thereof, and also perform data thinning in terms of space and/or time on the frame image and send the thinned frame image data to the console 2 in almost real time, and the console 2 may display the frame image data received from the FPD cassette 4 on the display unit 24 in almost real time. In this case, when dynamic imaging finishes, the FPD cassette 4 may send, to the console 2, all the frame image data before data thinning or the frame image data which is not sent to the console 2 yet, the date being stored in the storage unit of the FPD cassette 4. This enables control to display, on the display unit 24, the frame image obtained by the FPD cassette 4 in almost real time during dynamic imaging even if the communication capacity per unit time is small due to use of a wireless network or the like. Thereby, a user such as a radiologist can quickly grasp the abnormal state of imaging from the frame image displayed on the display unit 24 and hence can determine to stop imaging, which can protect patients from being unnecessarily exposed when imaging is abnormal.

There is a case where during reading by the FPD cassette 4, electromagnetic waves (noise caused by environment) emitted from a visiting or portable radiation generation apparatus or a treatment apparatus such as a high-frequency treatment apparatus placed around the FPD cassette 4 are applied to the FPD cassette 4, and artifacts occur in the image data read from/by the FPD cassette 4. Hence, preferably, the FPD cassette 4 or the console 2 detects, before or during imaging, electromagnetic waves and frequency characteristics thereof in the vicinity of the FPD cassette 4, and estimates, based on the detected frequency characteristics, a spatial pattern (spatial frequency) of artifacts such as streaks occurring on the image data, and the FPD cassette 4 or the console 2 performs an image correction process on the obtained frame images so as to attenuate the artifacts of the estimated spatial pattern. The artifact estimation and the correction process can improve the diagnostic accuracy based on analysis results of dynamic images.

In the above, a hard disk, a nonvolatile semiconductor memory or the like is used as a computer readable medium of the programs of the present invention. However, this is not a limitation. As the computer readable medium, a portable storage medium such as a CD-ROM can be used. Further, as a medium to provide data of the programs of the present invention, a carrier wave can be used.

The detailed configurations and actions of the apparatuses or the like constituting the dynamic analysis system can also be appropriately modified within a range not departing from the spirit of the present invention.

What is claimed is:

1. A dynamic analysis system that analyzes a plurality of frame images showing a dynamic state of a chest of a subject, comprising:
    an operation unit to select a region in a lung field region of the subject; and
    an analysis unit that calculates a characteristic amount of indicating a local motion in the lung field region, wherein
    the analysis unit calculates, based on the selected region and the calculated characteristic amount, a ratio of the characteristic amount in an unselected region except the selected region from the lung field region that is an entire lung field region to the characteristic amount in the entire lung field region.

2. The dynamic analysis system according to claim 1, wherein the characteristic amount indicating the local motion in the lung field region is the characteristic amount indicating a ventilation function or a bloodstream function in the lung field region.

3. The dynamic analysis system according to claim 1, wherein the characteristic amount indicating the local motion in the lung field region is the characteristic amount indicating local signal change in the lung field region.

4. The dynamic analysis system according to claim 3, wherein
    the characteristic amount indicating the local signal change in the lung field region is an inter-frame difference value, and
    the analysis unit calculates a ratio of an integrated value of the inter-frame difference value of the unselected region except the selected region from the entire lung field region to an integrated value of the inter-frame difference value of the entire lung field region.

5. The dynamic analysis system according to claim 1, further comprising a display unit that displays an analysis result based on the ratio calculated by the analysis unit.

* * * * *